(12) United States Patent
Atzeni

(10) Patent No.: US 12,103,503 B2
(45) Date of Patent: Oct. 1, 2024

(54) VEHICLE WHEEL ASSEMBLY

(71) Applicant: Invaction S.R.L., Genoa (IT)

(72) Inventor: Christian Atzeni, Genoa (IT)

(73) Assignee: Invaction S.R.L., Genoa (IT)

( * ) Notice: Subject to any disclaimer, the term of this patent is extended or adjusted under 35 U.S.C. 154(b) by 559 days.

(21) Appl. No.: 17/420,705

(22) PCT Filed: Jan. 7, 2020

(86) PCT No.: PCT/IB2020/050083
§ 371 (c)(1),
(2) Date: Jul. 5, 2021

(87) PCT Pub. No.: WO2020/144570
PCT Pub. Date: Jul. 16, 2020

(65) Prior Publication Data
US 2022/0097659 A1    Mar. 31, 2022

(30) Foreign Application Priority Data

Jan. 7, 2019  (IT) .......................... 102019000000109

(51) Int. Cl.
*B60T 1/10* (2006.01)
*B60K 6/10* (2006.01)

(52) U.S. Cl.
CPC .............. *B60T 1/10* (2013.01); *B60K 6/105* (2013.01); *B60T 2270/60* (2013.01)

(58) Field of Classification Search
CPC ....... B60T 1/10; B60T 2270/60; B60K 6/105; Y02T 10/92
See application file for complete search history.

(56) References Cited

U.S. PATENT DOCUMENTS 10,843,715 B2 * 11/2020 Pyper ..................... B60L 50/30
11,780,411 B2 * 10/2023 Bennett ..................... B60T 1/10
                                                              60/413
(Continued)

FOREIGN PATENT DOCUMENTS

CN        200942711 Y  *  9/2007
DE         3126487 A1     1/1983
(Continued)

*Primary Examiner* — James A Shriver, II
*Assistant Examiner* — Michael T. Walsh
(74) *Attorney, Agent, or Firm* — David Guerra

(57) ABSTRACT

Assembly (1) comprising at least one vehicle wheel (2), adapted to rotate about a vehicle wheel axis (X2) and adapted to perform an at least rolling movement on a travel surface for the vehicle; at least one flywheel (4), adapted to rotate about a flywheel axis (X4) which can be operatively connected to said at least one vehicle wheel (2), in such way the vehicle wheel (2) can transmit kinetic energy to the flywheel (4); at least one kinetic energy recovery device (10), operatively associated with said flywheel (4) and adapted to store the kinetic energy transmitted to said at flywheel (4), to make it available for subsequent uses; at least one clutch (8), adapted to connect and disconnect selectively and operatively said vehicle wheel (2) and said flywheel (4), in order to uncouple said flywheel (4) from said vehicle wheel (2), to allow said flywheel (4) to rotate due to inertia when the vehicle wheel (2) is stopped, and in such way to couple said vehicle wheel (2) when is standstill to said flywheel (4) rotating due to inertia, to transfer a start-up rotational motion from said flywheel (4) to said vehicle wheel (2).

20 Claims, 18 Drawing Sheets

(56) References Cited

U.S. PATENT DOCUMENTS

| | | | | |
|---|---|---|---|---|
| 2007/0207699 | A1* | 9/2007 | Hoeting | A63H 29/20 |
| | | | | 446/440 |
| 2008/0210500 | A1* | 9/2008 | Walker | B60K 6/105 |
| | | | | 701/70 |
| 2008/0308335 | A1* | 12/2008 | Anderson | B60K 1/00 |
| | | | | 180/165 |
| 2015/0143932 | A1* | 5/2015 | Igarashi | B62D 37/06 |
| | | | | 74/5.4 |
| 2023/0399075 | A1* | 12/2023 | Athalye | F16D 61/00 |

FOREIGN PATENT DOCUMENTS

| | | | | |
|---|---|---|---|---|
| DE | 3912339 | A1 * | 10/1990 | |
| DE | 2848835 | A1 | 3/2015 | |
| EP | 2058037 | A1 | 5/2009 | |
| EP | 2058037 | B1 * | 8/2010 | A63H 17/16 |
| IT | 1144792 | B * | 10/1986 | |
| JP | 2004072980 | A * | 3/2004 | |
| WO | WO-8403070 | A1 * | 8/1984 | |
| WO | WO-0129956 | A1 * | 4/2001 | H02K 16/02 |
| WO | WO-2005100068 | A1 * | 10/2005 | B60K 6/105 |
| WO | 2013083885 | A1 | 6/2013 | |
| WO | WO-2014041326 | A1 * | 3/2014 | B60K 6/105 |
| WO | WO-2015019803 | A1 * | 2/2015 | B60K 6/10 |
| WO | 2016157146 | A1 | 10/2016 | |
| WO | 2019010306 | A1 | 1/2019 | |

* cited by examiner

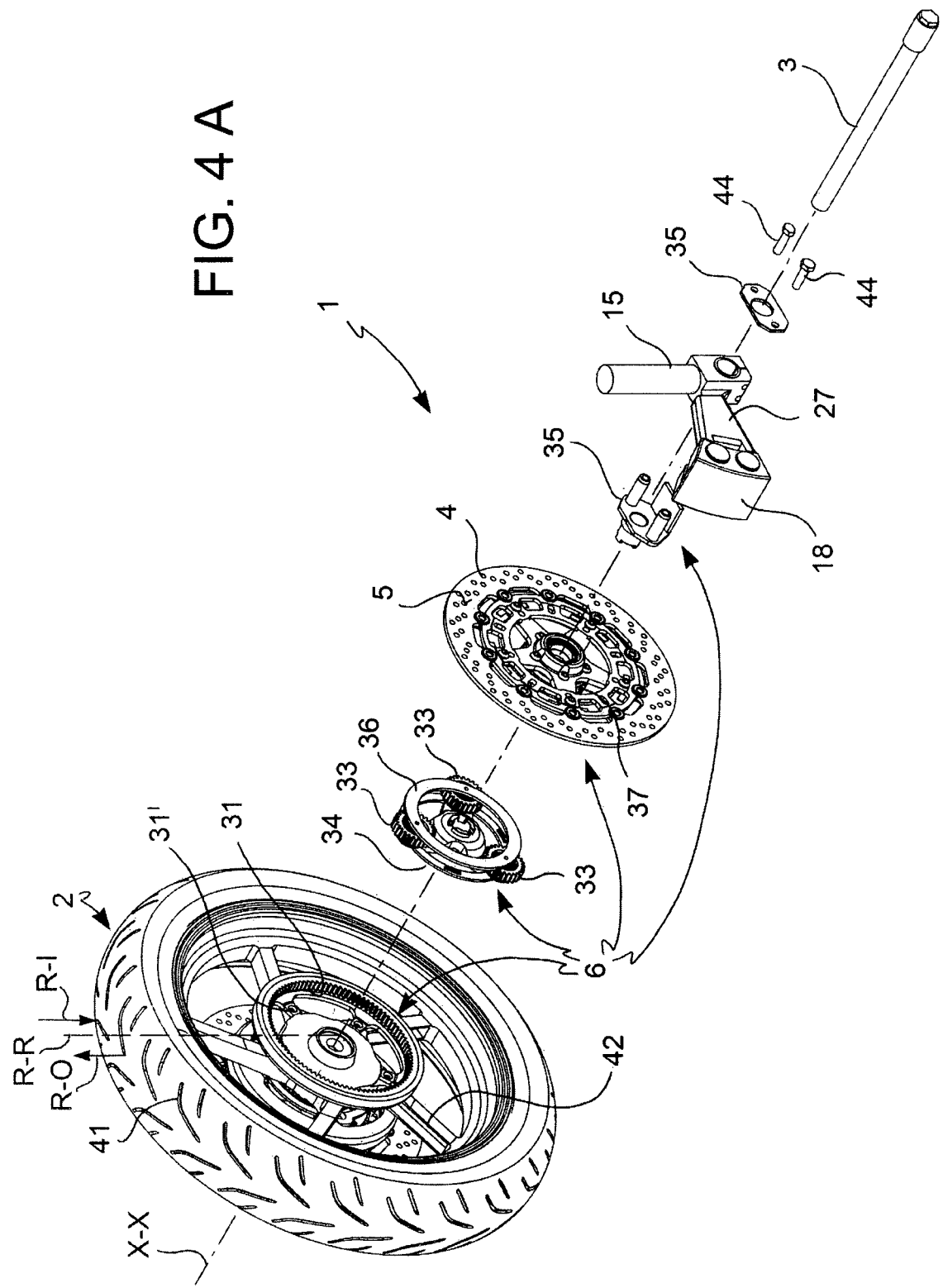

VEHICLE WHEEL ASSEMBLY

CROSS-REFERENCE TO RELATED APPLICATIONS

This application is an U.S. national phase application under 35 U.S.C. § 371 based upon co-pending International Application No. PCT/IB2020/050083 filed on Jan. 7, 2020. Additionally, this U.S. national phase application claims the benefit of priority of co-pending International Application No. PCT/IB2020/050083 filed on Jan. 7, 2020 and Italian Application No. IT 102019000000109 filed on Jan. 7, 2019. The entire disclosures of the prior applications are incorporated herein by reference. The international application was published on Jul. 16, 2020 under Publication No. WO 2020/144570 A1.

FIELD OF THE INVENTION

The present invention relates to an assembly for a vehicle.

Furthermore, the present invention relates to a vehicle comprising at least one assembly.

The present invention further relates to a vehicle wheel assembly comprising said assembly, as well as to a system to control said assembly.

Furthermore, the present invention relates to a braking method.

Furthermore, the present invention relates to a kinetic energy recovery method.

Furthermore, the present invention relates to a method for increasing the instantaneous power of a vehicle.

BACKGROUND ART

In general, motor-powered vehicles, e.g. powered by electrical motors, dissipate kinetic energy in the form of heat while braking, which overheats the braking system components, making them less efficient and less ready to respond to a braking command.

Conversely, in the case of racing vehicles equipped with carbon-ceramic brake discs, a given predetermined overheating of such brake discs is preferable in order to obtain a desired braking action.

The need to customize the braking parameters as necessary is thus felt.

In vehicles to be mounted, such as motorcycles and velocipedes, controlling of the vehicle attitude in forward travel conditions is a complex phenomenon based on the dynamic balance which is biased by the gyroscopic effect. Indeed, the rolling of the wheels of the vehicle to be mounted on the advancement surface of the vehicle, such as the road surface, by the effect of the rotation of the wheels themselves about a respective rotation axis, generates a gyroscopic momentum.

Indeed, in order to turn, the rider of a vehicle to be mounted, such as a motorcycle, must lean sideways or roll the motor vehicle in the direction of the turn, so that the rotation of the steering wheel, or of the steered wheels if there are more than one, generates a gyroscopic momentum aimed at favorably rotating the steering, usually connected to the forecarriage, of the motorcycle in the direction of the turn. Similarly, during the step of rolling, the gyroscopic effect given by the wheels which are inclined with respect to the vertical, i.e. with respect to the weight-force direction, generates by gyroscopic reaction a momentum aimed at straightening the motorcycle, in other words, aimed at reducing or canceling the rolling angle. As a result, when the motorcycle is exiting a turn to go straight, the gyroscopic momentum given by the rotation of the steering wheel, or of the steered wheels if more than one, tends to straighten the vehicle to be mounted. Furthermore, the gyroscopic effect of a motorcycle wheel movement favorably tends, when the motorcycle is in a rolling condition, e.g. when turning, causes the vehicle to yaw.

For these reasons, the gyroscopic effect provides a stabilizing effect to the vehicle to be mounted in rolling conditions, both when entering and exiting the turn, as well as when turning. Because of the gyroscopic effect, the behavior of the motorcycle when turning becomes more rigid as the advancement speed of the motorcycle increases. Indeed, because of such a stabilizing effect given by the gyroscopic momentum generated by one or more rotating wheels of the motorcycle, as the advancement speed of the motorcycle, and thus the angular rotation speed of the motorcycle wheels, increases, the rider is often unable to counteract such a gyroscopic effect, which tends to straighten the motorcycle in rolling conditions, e.g. when turning, and so the rider is unable or at least slowed down, in leaning the motorcycle by a useful rolling angle which allows to turn at fast advancement speeds. Therefore, the stabilizing effect given by the gyroscopic momentum generated by a rotating motorcycle wheel is often undesirable, and not only in racing applications, as it imposes slow advancement speeds in rolling conditions, e.g. when turning. The gyroscopic momentum is further increased by the provision of motors integrated in the wheel, known as in-wheel motors, in which generally one of either the stator or the rotor is integral and stationary with respect to the vehicle chassis or with a part thereof and the other of either the stator or rotor is integral in rotation to the wheel, thereby increasing its mass and worsening, even considerably, the gyroscopic effect. On the other hand, the gyroscopic stabilizing effect is minimal during the forward travel of the motorcycle at low forward speeds by effect of the low rotation speed of the wheels of the motorcycle, and therefore the motorcycle is in unstable equilibrium conditions. Therefore, it is also typically undesirable to have no stabilizing effect at slow advancement speeds on a straight course.

Also in the case of cars, i.e. vehicles which are unsuitable for rolling, the gyroscopic stabilizing effect is undesirable when turning, e.g. generating a lateral drag which may limit the ability of the vehicle to achieve narrower turn lines, i.e. with a reduced radius of curvature, at high speeds. Furthermore, also on cars, the provision of at least one such in-wheel motor generates an increased gyroscopic effect which further reduces the maneuverability of the vehicle when turning, e.g. by requiring the vehicle to make wide turns, i.e. with a high radius of curvature, when the vehicle is traveling at fast advancement speeds, as in the case of racing or emergency vehicles.

In response to the need to provide a solution to regulate the gyroscopic moment generated by the rotating wheels of a vehicle, for example, document EP-2085037 shows a toy motorcycle having a magnetic transmission equipped with a flywheel connected to a programmable logic controller in order to stabilize such a toy vehicle when the vehicle slows down. Furthermore, document WO-2014-041326 discloses a solution of variable continuous transmission system (CVT) based on a drive train to allow the flywheel to rotate on the same plane but in the opposite direction with respect to the vehicle wheels.

Furthermore, starting a stationary vehicle requires given mechanical energy to be transmitted from the motor, or from other component or components, to the drive wheel or wheels of the vehicle in a very short lapse of time. In order to meet the need to provide a solution capable of storing at least a share of the kinetic energy dissipated during the braking action, so that it is available to cooperate in starting the vehicle from standstill, various regenerative braking systems have been suggested, e.g. of the start-stop type with a flywheel which can be connected to a vehicle wheel and is adapted to rotate by inertia when decoupled from the wheel, e.g. as shown in documents WO-2005-100068, DE-3126487, WO-2015-19803, EP-2848835, WO-2013-083885 and, albeit for applications on railway vehicles, in WO-2016-157146. The aforesaid regenerative braking systems still require the flywheel to be fitted with an emergency brake to dissipate an excess stored energy. An example of a document showing an emergency brake for the flywheel is given by WO-2019-010306, intended to stop the flywheel when it is uncoupled from the wheel.

Electrically powered vehicles equipped with accumulators or battery recharging systems based on the recovery of a share of kinetic energy which could be dissipated by friction during braking are also known. However, during the step of braking of the vehicle, the performance of such known systems is limited by the existing accumulators which are typically unsuitable to store the huge peak current generated by the conversion of a portion of kinetic energy otherwise destined to be dissipated in form of heat in the short time available. Furthermore, in the known kinetic energy recovery systems, however, the batteries require the movement of the vehicle to charge.

Therefore, the need is felt to provide a flexible and versatile solution capable of storing at least a share of the kinetic energy dissipated during the service braking action, so that it is available to be converted into electrical energy and stored in a dedicated electrical energy storage unit, even when the vehicle is slowing down or even when stationary, if necessary.

Similarly, the need is also felt to provide a solution capable of storing at least a proportion of the kinetic energy which would be dissipated during the braking action so that it is available when the vehicle is in a step of accelerating following a service braking, as necessary.

The need is also felt to provide a solution capable of reducing the fuel consumption of an internal combustion engine, as well as the electricity consumption of the motors powered by electricity and, more generally, of any form of energy used.

Furthermore, the need is further felt to reduce the environmental impact deriving from the fuel consumption of vehicles and also from the disposal of parts and components which necessarily have a limited service life, such as battery-powered electronic components.

SUMMARY

It is an object of the present invention to solve the drawbacks of the prior art and to provide a solution to the needs described hereto with reference to the prior art.

These and other objects are achieved by an assembly according to claim 1, a vehicle, a wheel assembly and a method according to claim the appended claims.

Some advantageous embodiments are the object of the dependent claims.

According to an aspect of the assembly, devices, vehicles and methods according to the invention, an assembly comprises at least one vehicle wheel and at least one further rotating member which can be operatively connected to said vehicle wheel, and at least one transmission, which achieves a transmission ratio which may be equal to or different from +1.

According to an aspect of the assembly, devices, vehicles and methods according to the invention, at least one braking device is provided which acts on said at least one further rotating member in order to brake said vehicle wheel, possibly until stopping it, by means of a braking action acting on said at least one further rotating member.

According to an aspect of the assembly, devices, vehicles and methods according to the invention, said at least one further rotating member preferably comprises at least one braking surface, designed to exchange frictional forces with friction material of said braking system, which either comprises or is formed by a friction braking system.

According to an aspect of the assembly, devices, vehicles- and methods according to the invention, the at least one further rotating member comprises at least one of either: a flywheel, a brake disc, a brake drum, a combination of the above.

According to an aspect of the assembly, devices, vehicles and methods according to the invention, such transmission is either integral with or may be made integral with a portion of such vehicle chassis.

According to an aspect of the assembly, devices, vehicles and methods according to the invention, a further flywheel is provided so as to provide one or more flywheel pairs, wherein the flywheels of a flywheel pair may be mutually counter-rotating.

According to an aspect of the assembly, devices, vehicles and methods according to the invention, a single further rotating member is provided associated with a single braking device, so that said single braking device is the only device associated with said vehicle wheel provided to brake the vehicle wheel, possibly until stopping it.

According to an aspect of the assembly, devices, vehicles and methods according to the invention, such transmission is either integral with or may be made integral with a portion of such vehicle chassis.

According to an aspect of the assembly, devices, vehicles and methods according to the invention, said transmission comprises a planet gear train with planet gears and a planet carrier, wherein the planet carrier consists of at least one of either: the vehicle wheel; the vehicle chassis; a suspension system, e.g. a fork or swingarm; a fork leg; a brake caliper support, e.g. a floating caliper bracket; a preferably friction-based braking device; a combination of the above.

According to an aspect of the assembly, devices, vehicles and methods according to the invention, at least one clutch is adapted to connect and disconnect selectively and operatively said vehicle wheel and said flywheel.

According to an aspect of the assembly, devices, vehicles and methods according to the invention, at least one clutch is adapted to connect and disconnect selectively and operatively the flywheels of said at least one flywheel pair.

According to an aspect of the assembly, devices, vehicles and methods according to the invention, at least one clutch is adapted to connect and disconnect selectively and operatively a first flywheel pair from a second flywheel pair.

According to an aspect of the assembly, devices, vehicles and methods according to the invention, a vehicle, e.g. a motorcycle, comprises a brake caliper placed in front of the fork.

According to an aspect of the assembly, devices, vehicles and methods according to the invention, a transmission is provided which preferably comprises at gear train adapted to connect the vehicle chassis, the wheel and at least one further rotating member operatively to one another, thereby achieving a transmission ratio which may be different from +1.

According to an aspect of the assembly, devices, vehicles and methods according to the invention, at least one planet gear of a gear train of a transmission forms a clutch.

BRIEF DESCRIPTION OF THE DRAWINGS

Further features and advantages of the invention will be apparent from the description provided below of preferred embodiments thereof, given by way of non-limiting examples, with reference to the accompanying drawings, in which:

FIG. 1 B is a block chart of an assembly, according to an embodiment;

FIG. 1 C is a block chart of an assembly, according to an embodiment;

FIG. 1 D is a block chart of an assembly, according to an embodiment;

FIG. 1 E is a block chart of an assembly, according to an embodiment;

FIG. 1 F is a block chart of an assembly, according to an embodiment;

FIG. 1 G is a block chart of an assembly, according to an embodiment;

FIG. 2 B diagrammatically shows a vehicle comprising an assembly, according to an embodiment;

FIG. 3 B diagrammatically shows an assembly, according to an embodiment;

FIG. 4 B shows a vertical elevation view of the assembly of FIG. 4 A with parts separated;

FIG. 4 C shows an assembly, according to an embodiment;

FIG. 5 B is a cross-section view taken along an axial-radial plane which shows an assembly, according to an embodiment;

FIG. 6 B is a cross-section view taken along an axial-radial plane which shows an assembly, according to an embodiment;

FIG. 7 B is an enlargement of a detail in FIG. 7 A in which some parts are made transparent for the sake of clarity;

FIG. 8 B is a cross-section view taken along an axial-radial plane which shows an assembly, according to an embodiment;

FIG. 9 B is a vertical elevation view with parts separated of the assembly in FIG. 9 A;

FIG. 9 C is a plan view with parts assembled of the assembly in FIG. 9 A or in FIG. 9 B;

DETAILED DESCRIPTION OF SOME EMBODIMENTS

Figure 1:
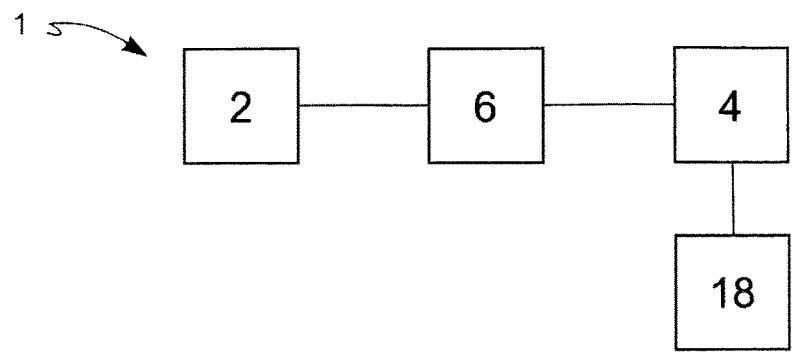
FIG. 1 A is a block chart of an assembly, according to an embodiment.
Figure 1:
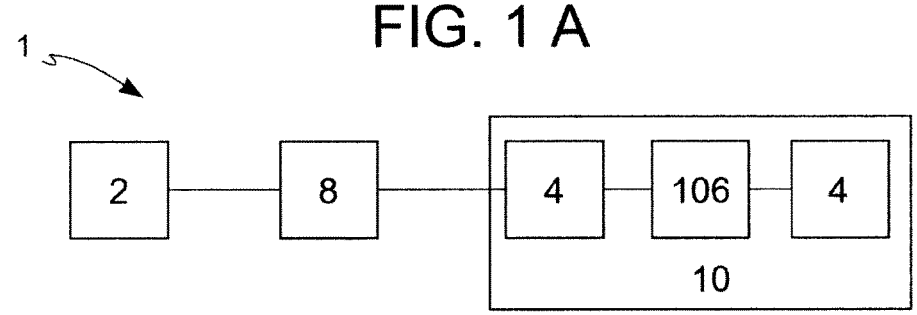
Figure 1:
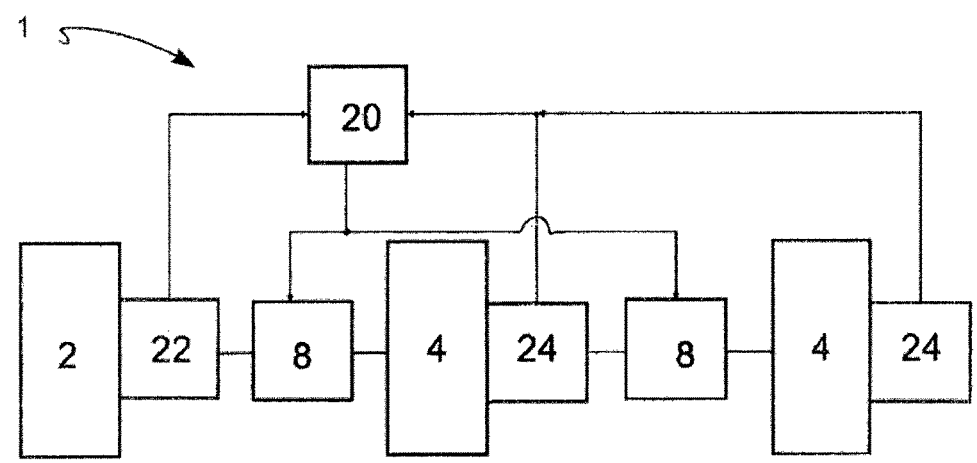
Figure 1:
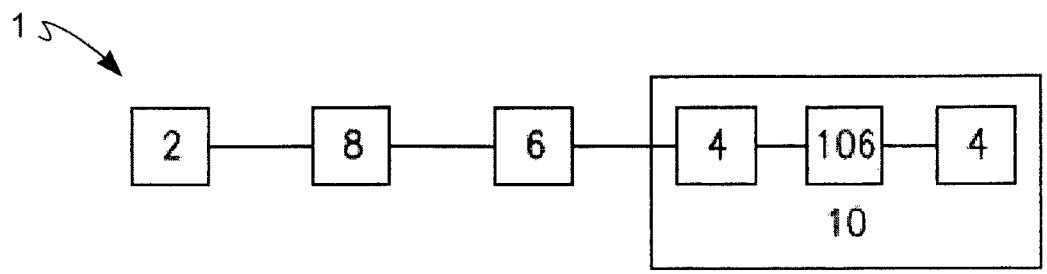
Figure 1:
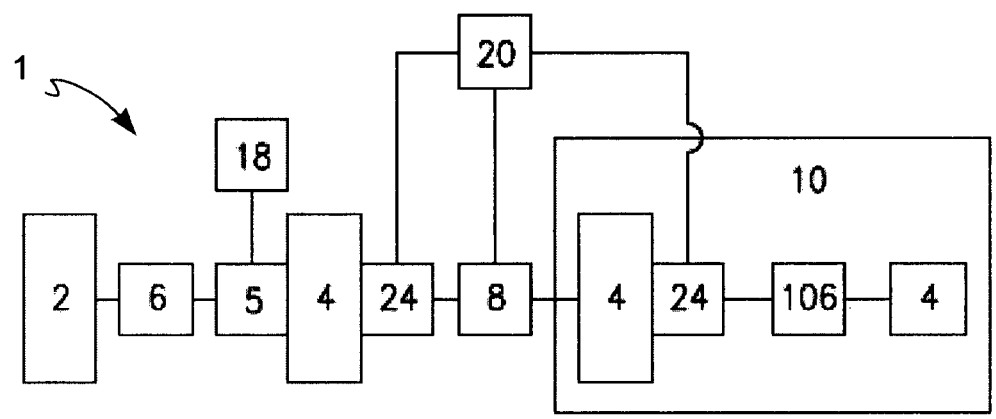
Figure 1:
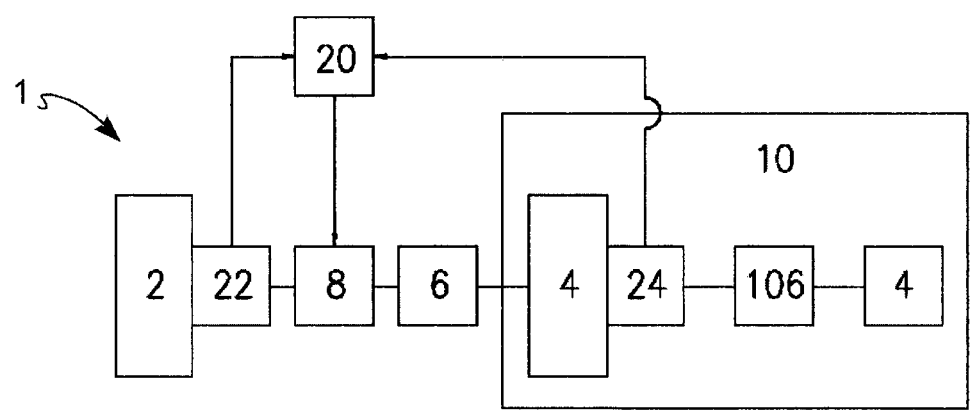
Figure 1G:
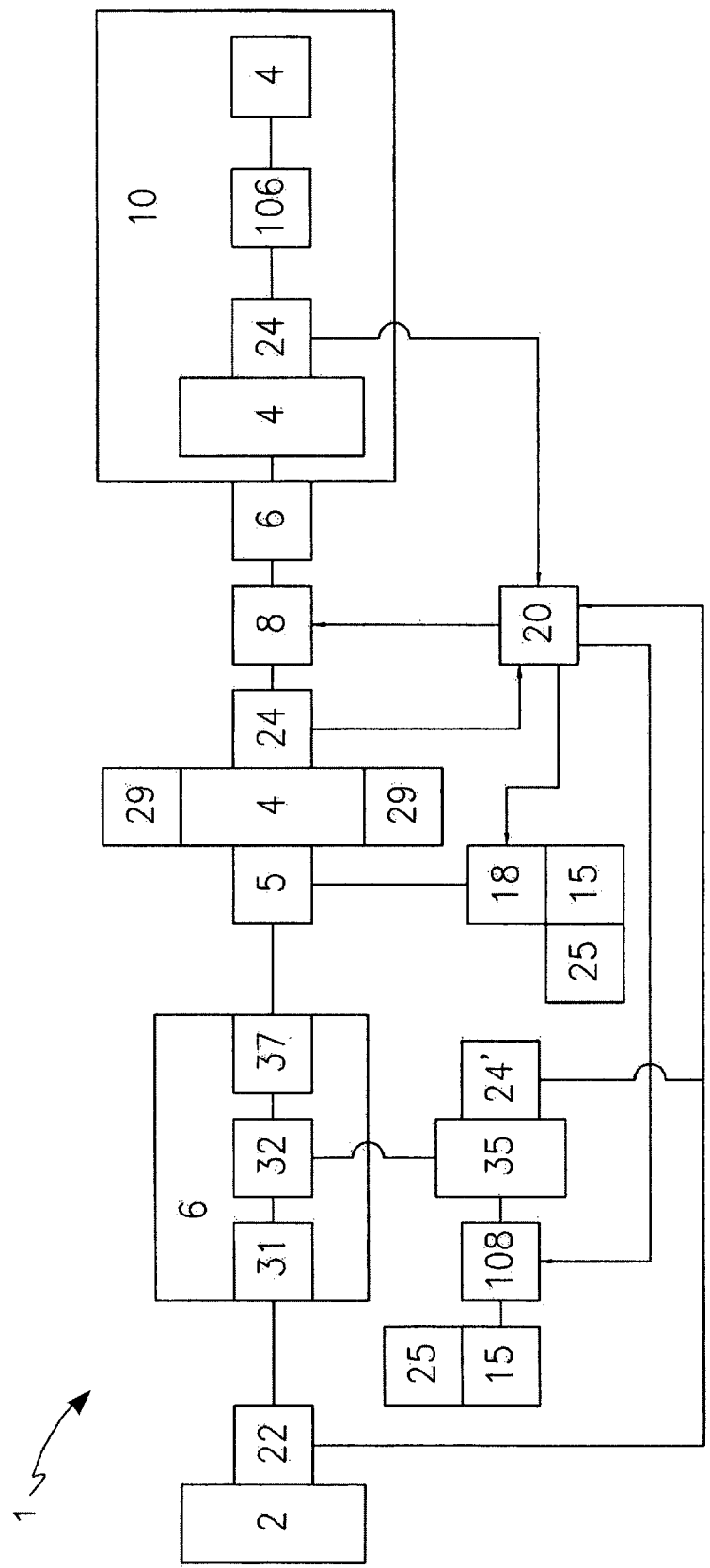

An assembly 1 for a vehicle 40 is provided according to a first general embodiment. With reference to the accompanying figures, said assembly 1 is indicated by reference numeral 1. Common elements or common parts of elements will be indicated with the same reference numerals.

Said assembly 1 comprises at least one vehicle wheel 2, adapted to rotate about a vehicle wheel axis X2 and adapted to perform at least a rolling movement on an advancement surface 39 for the vehicle 40, such as a road surface. Said wheel axis X2 is transverse to the forward travel direction Y or reverse direction of the vehicle 40.

Said vehicle wheel 2 preferably comprises a rim body 42 and a tire 41, e.g. tubeless, associated with the rim body 42. A wheel axle 3 can support the vehicle wheel 2 by connecting it rotationally to the chassis 15 of the vehicle 40, e.g. a vehicle suspension and/or a fork or swingarm. The wheel axle 3 is preferably integral with the chassis 15. Rolling elements 43 may be interposed between said wheel axle 3 and the rim body 42 of the vehicle wheel 2. The vehicle wheel 2 may be a drive wheel, e.g. driven by a motor, e.g. powered by an electrical motor, e.g. an in-wheel electrical motor, or it may be a driven wheel of a vehicle.

The provision of said vehicle wheel 2 generates a gyroscopic force having a stabilizing effect on the attitude of vehicle 40 when said vehicle 40 is in forward travel or reversing conditions Y on said advancement surface 39, e.g. a road surface.

Said assembly 1 is particularly suited but not univocally intended for, applications on vehicles 40 adapted to tilt or roll when turning, e.g. bikes, motorcycles, and/or mopeds, and/or scooters with at least two or at least three wheels, e.g. scooters with two steering and/or driving wheel, as well as quadricycles. Preferably, said assembly 1 is particularly suited but not univocally intended for application on motorcycles.

Preferably, said assembly 1 is suited for application on cars. Preferably, said assembly 1 is suited for application on vehicles 40 equipped with multiple wheels, such as trucks, trains and aircraft.

Said assembly 1 is particularly suited but not univocally intended for applications on motor vehicle, e.g. with internal combustion engine and/or electrical motor.

An assembly 1 is particularly suited but not univocally intended for applications on racing vehicles 40 and on high-performance vehicles 40.

There are defined an axial direction X-X substantially coincident with the wheel rotation axis X2, a radial direction R-R orthogonal to the axial direction X-X and incident thereto which defines an inner radial direction RI facing the axial direction X-X and an outer radial direction RO opposite to said inner radial direction RI, and a tangential direction C-C or circumferential C-C, orthogonal to both the axial direction X-X and the radial direction R-R.

Said assembly 1 further comprises at least one flywheel 4, which can be operatively connected to said at least one vehicle wheel 2 and adapted to rotate about a rotation axis of a further flywheel axis X4. Said rotation axis of further rotating member X4 is transverse to the forward travel direction Y or reverse direction of the vehicle 40 and is preferably parallel to the wheel axis X2. According to an embodiment, said wheel axis X2 and said rotation axis of further rotating member X4 are parallel. According to an embodiment, said wheel axis X2 and said rotation axis of further rotating member X4 are substantially coinciding.

The operative connection between said at least one further rotating member 4 and said at least one vehicle wheel 2 may comprise a first transmission 6 and a first clutch 8.

According to an embodiment, e.g. as diagrammatically shown in FIG. 1-D, the operative connection between said at least one further rotating member 4 and said at least one vehicle wheel 2 comprises both a transmission 6 and a clutch 8. For example, said transmission 6 may be designed to multiply the revolutions per minute of the further rotating member 4 with respect to the vehicle wheel 2.

Said further rotating member 4 can be rotationally associated with the wheel axle 3 by interposition of rolling elements 43.

When more than one further rotating members 4 are provided, an operative connection may be provided between at least some, but also all, of said further rotating members. The operative connection between at least some of these further rotating members may comprise a further transmission 106 and a further clutch.

According to a preferred embodiment, not necessarily combinable with all the embodiments described above, the transmission 6 is adapted to transmit mechanical power, preferably rotational kinetic energy, between said at least one further rotating member 4, e.g. at least one flywheel, and/or said vehicle wheel 2 and/or other further rotating member 4, is directly connected and/or equipped with at least one flexible connection, e.g. a flexible coupling. In other words, said transmission device is adapted to transmit kinetic energy from the vehicle wheel 2 to the at least one further rotating member device 4, e.g. at least one flywheel, and/or to another further rotating member device 4 either directly or indirectly, e.g. by the interposition of at least one flexible coupling, e.g. a flexible coupling. For example, at least three further rotating members may be provided, wherein one is associated with a braking device 18 and the other two are associated with each other forming a flywheel pair which preferably counter-rotate with respect to each other, and wherein a transmission is preferably provided between said further rotating member acting as brake and at least one flywheel of said flywheel pair. For example, at least two further rotating members may be provided, wherein one is associated with a braking device 18, and another forms a flywheel, preferably said at least two counter-rotating rotating members, and wherein a transmission is preferably interposed between them, and wherein a clutch is interposed between them.

Said at least one further rotating member 4 can act as brake disc and/or brake drum and/or flywheel and/or rotor/stator of electrical machine. When more than one further rotating members 4 are provided, they may have different functions, generating a resulting gyroscopic force having an effect on the attitude of the vehicle 40, at least one further rotating member 4 may act as a brake disc and/or flywheel and/or rotor/stator of an electrical machine.

According to a preferred embodiment, said assembly 1 comprises a transmission 6, adapted to transmit mechanical power, and preferably rotational kinetic energy, between said at least one vehicle wheel 2 and said at least one further rotating member 4. The transmission 6 may be adapted to transmit mechanical power in one direction only, and preferably in both directions.

The transmission ratio achieved by said transmission 6 may be either positive or negative.

The term "negative transmission ratio" indicates a counter-rotation transmission ratio. In this manner, the vehicle wheel 2 and the further rotating member 4, by effect of the transmission 6, rotate in the opposite direction with respect to a common reference which is substantially stationary with respect to the chassis 15 of the vehicle 40, e.g. such as a wheel axle 3 or a vehicle suspension or a motorcycle fork. Therefore, the term "counter-rotation" is not meant to indicate that one of either said vehicle wheel 2 or said further rotating member 4 is stationary in relation to the chassis 15 and that the other rotates, but instead is meant to indicate that both said vehicle wheel 2 and said further rotating member device 4 rotate in the opposite direction with respect to the chassis 15.

The provision of a negative transmission ratio which determines the counter-rotation between said vehicle wheel 2 and said further rotating member 4 allows to compensate for at least a share of the gyroscopic force of vehicle wheel 2 which generates a stabilizing effect on the vehicle 40. In this manner, a destabilizing effect on the vehicle 40 can be achieved by appropriately sizing the negative transmission ratio and the distribution of the masses in radial direction of the at least one vehicle wheel 2 and/or the at least one further rotating member 4.

A further stabilizing or hyper-stabilizing effect on the vehicle 40 can also be achieved according to the sizing of the negative transmission ratio and the distribution of the masses in radial direction of the at least one vehicle wheel 2 and/or of the at least one further rotating member 4.

According to a preferred embodiment, said transmission 6 achieves a transmission ratio equal to −1. In this manner, said vehicle wheel 2 and said further rotating member 4 rotate at equal angular speed.

The positive transmission ratio between the vehicle wheel 2 and the further rotating member allows to generate a further stabilizing effect on the vehicle 40.

A person skilled in the art will appreciate that it is possible to achieve a further stabilizing effect on the vehicle 40, e.g. by providing a negative multiplication transmission ratio, i.e. a transmission ratio less than −3, also by providing a negative transmission ratio and appropriately sizing the negative transmission ratio and the distribution of the masses in radial direction of at least one vehicle wheel 2 and/or at least one further rotating member 4.

According to an embodiment, said further rotating member 4 which acts as a brake disc is made of carbon fiber and/or carbon-ceramic material. The suitable operating temperature of a brake disc made of carbon fiber and/or carbo-ceramic material can be achieved, for example, by sizing the multiplication ratio.

According to an embodiment, said assembly 1 further comprises a flywheel braking device 18 associated with said flywheel 4, adapted to apply a braking action onto said flywheel 4 to brake the vehicle wheel 2, possibly until stopping it, by means of said transmission device 6 which achieves a transmission ratio.

According to a preferred embodiment, said transmission 6 achieves a transmission ratio different from +1.

The transmission ratio may be greater than 1 in absolute value, i.e. greater than +1 and/or less than −1, so that said transmission ratio is a speed multiplication ratio. For the purposes of this patent, a speed multiplication transmission ratio is indicated when the angular speed of the further rotating member 4 is multiplied by said transmission ratio achieved by said transmission 6 with respect to the angular speed of the vehicle wheel 2, in the case of both positive and negative transmission ratios.

The transmission ratio may be less than 1 in absolute value, i.e. comprised between −1 and 1, and different from zero, so that the transmission ratio is a speed multiplication ratio. For the purposes of this patent, a speed reduction transmission ratio is indicated when the angular speed of the further rotating member 4 is reduced by said transmission ratio achieved by said transmission 6 with respect to the angular speed of the vehicle wheel 2, in the case of both positive and negative transmission ratios.

The transmission 6 may comprise a continuously variable speed drive, e.g. a CVT, so that the transmission ratio is variable.

The transmission 6 may comprise a simple gear train, e.g. a pair of gears, the first of the two gears of the pair being connected to either the vehicle wheel 2 or the at least one further rotating member 4, and the second of the two gears of the pair being connected to one either the at least one further rotating member 4 or the vehicle wheel 2.

According to an embodiment, said transmission 6 comprises at least one gear train, adapted to transmit rotational motion. According to an embodiment, said at least one gear train comprises at least a pair of pulleys, e.g. toothed pulleys, and a belt, e.g. a toothed belt, mutually in contact, wherein the rotation axes of said pulleys have at least one portion integral with the chassis 15 of the vehicle. For example, such an assembly 1 is adapted to form a vehicle wheel assembly, wherein the rotation axis X2 of the wheel 2 and the rotation axis X4 of the flywheel 4 are parallel.

According to a preferred embodiment, said assembly 1 comprises at least one braking device 18, preferably a friction braking device, adapted to apply a braking action, preferably a friction braking action, on said at least one further rotating member 4 in order to brake said at least one vehicle wheel 2, possibly until stopping it, by braking said at least one further rotating member 4. The braking action may, for example, be applied by electromagnetic means.

The braking action applied by said braking device 18 on at least one further rotating member 4 is transmitted to the vehicle wheel 2 by the said transmission 6, which achieves said transmission ratio. When the transmission ratio achieved by said transmission 6 is different from +1 and −1, said braking action applied by said braking device 18 is transmitted to the vehicle wheel 2 according to the transmission ratio.

The provision of said braking device 18 associated with at least one further rotating member 4 makes said further rotating member 4 simultaneously adapted to generate a gyroscopic force having a stabilizing or destabilizing effect on the vehicle 40 and adapted to generate a braking torque on said at least one vehicle wheel 2.

Preferably, at least one further rotating member 4 comprises at least one braking surface 5, e.g. adapted to receive friction material from a friction braking device 18 for the purpose of braking said vehicle wheel 2, possibly until stopping it.

When a further rotating member 4 is provided, all further rotating members are not necessarily associated with a braking device 18. In this manner, an adjustment of the gyroscopic effect on the attitude of the vehicle 40 and an adjustment of the braking action on the vehicle 40 are allowed.

A person skilled in the art will appreciate that when said transmission 6 achieves an angular speed multiplication transmission ratio, the braking torque generated by the braking action, preferably friction braking, applied onto the further rotating member 4 is transmitted amplified to the vehicle wheel 2.

According to a preferred embodiment, the braking device is a friction braking device 18.

According to a variant, the braking device is a braking device comprising a hydraulic transmission.

According to a variant, the braking device is a braking device comprising an electro-magnetic braking system.

The transmission 6 preferably comprises at least one portion of solidification with the chassis 15 of the vehicle 40, which is either integral with or may be made integral, e.g. by means of a clutch 108, with a portion of the chassis 15. The consolidation may be a gradual and progressive process. The transmission 6 may act as a differential.

By appropriately configuring the transmission 6 and its components, it may be possible to allow the vehicle wheel 2 or at least one further rotating member 4 to not rotate under given operating conditions.

By appropriately configuring the transmission 6 and its components, it is possible to allow the further rotating member 4 to not rotate with respect to the vehicle wheel 2, i.e. to remain integral with the vehicle wheel 2, e.g. temporarily. For example, the planet carrier 34 may be decoupled from the chassis 15 being rotationally fed together with the further rotating member 4 by the vehicle wheel 2. For example, at least one planet gear 33 of said plurality of planet gears comprises a motion transmission axle to make said at least one planet gear integral with said vehicle 40, so as to transmit a rotational motion from said at least one further rotating member 4 to said at least one planet gear, and vice versa. A variable speed drive, e.g. a centrifugal variable speed drive and/or an electronic variable speed drive and/or a mechanical variable speed drive, may be associated with said transmission device 6 so as to vary the ratio between the angular moment of the vehicle wheel 2 and the angular moment of said at least one further rotating member 4. Preferably, said variable speed drive is comprised in said transmission 6 and, for example, is inserted inside the rim body 42 of the vehicle wheel 2.

According to a preferred embodiment, said transmission 6 comprises a gear train, e.g. a planetary gear set, comprising a pinion 37, an inner gear wheel or crown gear 31, and a plurality of planet gears 33 forming a planet gear train 32, operatively associated with the ring gear 31. Preferably, there are three planet gears 33 associated with a planet carrier 34. Said planet carrier 34 may comprises a carrier fitted with a "Y" shaped key tapping device to lock the rotation of the gear train and preferably, said planet carrier 34 is associated with a rotation locking device 35, which can be connected to the chassis 15 of the vehicle 40, e.g. to the fork leg 25 of a motorcycle, in order to prevent the rotation of the planet gear train 34 with respect to the vehicle chassis 15. A reinforcement ring 36 can be associated with the planet carrier 34. Fastening elements 44, e.g. threaded fasteners, may be provided to make at least one portion of the transmission device 6 integral with the vehicle chassis 15.

According to an embodiment, said ring gear 31 of the transmission 6 is either integral with or may be made integral, e.g. by means of a clutch, to the vehicle wheel 2, said pinion 37 is either integral with or may be made integral, e.g. by means of a clutch, in rotation with said at least one further rotating member 4, and said planet gear set 32 is either integral with or may be made integral, e.g. by means of a clutch, in rotation with the vehicle chassis 15, e.g. with a suspension device of vehicle 40 or a fork 25 of vehicle 40. In this manner, the counter-rotation between the vehicle wheel 2 and at least one further rotating member 4 can be obtained. For example, an assembly 1 provided with such a transmission 6 is adapted to form a vehicle wheel assembly for an in-wheel motor.

According to an embodiment, said ring gear 31 of the transmission 6 is either integral with or may be made integral with the vehicle chassis 15, one of either said pinion 37 or said planet gear set 32 is either integral with or may be made integral in rotation with the vehicle wheel 2 and the other of either said pinion 37 or said planet gear set 32 is either integral with or may be made integral with said at least one further rotating member 4. In this manner, the concordant rotation between vehicle wheel 2 and at least one further rotating member 4 can be obtained. For example, an assembly 1 provided with such a transmission 6 is adapted to form a vehicle wheel assembly for an in-wheel motor.

According to an embodiment, pinion 37 is either integral with or may be made integral with the vehicle chassis 15, one of either said ring gear 31 or said planet gear set 32 is either integral with or may be made integral in rotation with the vehicle wheel 2 and the other of either said ring gear 31 or said planet gear set 32 is either integral with or may be made integral with said at least one further rotating member 4. In this manner, the concordant rotation between vehicle wheel 2 and at least one further rotating member 4 can be obtained and said assembly 1 is adapted to form an in-wheel motor for a vehicle wheel assembly 30.

For example, it is possible to obtain the counter-rotation of vehicle wheel 2 and further rotating member 4 by fixing the planet carrier to the chassis 15.

According to a preferred embodiment, either said ring gear 31 or said pinion 37 is either integral with or may be made integral with the vehicle wheel 2 and the other of either said ring gear 31 or said pinion 37 is either integral with or may be made integral with said at least one further rotating member 4, and wherein said planet gear set 32 is either integral with or may be made integral as a whole in rotation with respect to the vehicle chassis 15, e.g. which is either integral with or may be made integral a suspension device of the vehicle 40. In this manner, the counter-rotation between the vehicle wheel 2 and at least one further rotating member 4 can be obtained.

According to an embodiment, either said ring gear 31 or said pinion 37 is integral with or may be made integral with the vehicle wheel 2 and the other of either said ring gear 31 or said pinion 37 is integral or may be made integral with said at least one other rotating member 4, and wherein said planet gear set 32 may be made integral or made free in rotation, e.g. by means of a clutch 108, with respect to the vehicle chassis 15, e.g. which integral with or may be made integral with a suspension device of the vehicle 40, e.g. by determining that when said planet gear set 32 is integral with respect to the vehicle chassis 15, the vehicle wheel 2 and the further rotating member 4 mutually counter-rotate, while, when said planet gear set 32 is made free to rotate with respect to the vehicle chassis 15, the vehicle wheel 2, the further rotating member 4 and the planet gear set 32 rotate in the same direction.

According to an embodiment, said transmission 6 comprises an ratchet wheel 23 (or free wheel) and/or a ratchet mechanism 23, or a ratchet or the like, adapted to transmit the rotational motion in one direction only. Preferably, said ratchet wheel mechanism 23 comprises at least one barb biased by a spring abutting against one side of at least one tooth of a gear wheel, so that said barb and said tooth cooperate to allow rotation of the gear wheel in one direction only. In this manner, it is possible to transmit mechanical rotation power in one direction only, as well as to brake said at least one further rotating member 4 without braking the vehicle wheel 2, to adjust the gyroscopic effect generated by the further rotating member 4, which acts as a flywheel. Furthermore, it is possible to slow down the vehicle wheel 2 without slowing down the flywheel and therefore, it is possible to obtain a given gyroscopic moment generated by said flywheel which tends to keep the vehicle 40 stable when the vehicle wheel 2 has an angular speed lower than the flywheel, e.g. when the vehicle 40 is traveling at slow speeds. At the same time, it is possible to exploit the higher angular speed of said at least one further rotating member 4 with respect to that of wheel 2 for energy recovery purposes without slowing down the vehicle wheel 2. For example, at least one planet gear 33 of said plurality of planet gears comprises a ratchet wheel 23 which allows the rotation of said planet gear in a single direction. In this manner, if the planet carrier 32 is made integral with the frame 15, when said planet gear 33 is rotationally fed in the free direction it will turn on its axle thus transmitting a rotational motion of opposite direction between crown gear 31 and pinion 37; vice versa, if the planet carrier 32 is made free to rotate with respect to the chassis 15 and said planet gear 33 is rotationally fed in the locked direction, its rotation on its axle will be prevented, thus transmitting such a rotational motion to the entire planet carrier 32 to the pinion 37 and to the crown gear 31, which will thus rotate in the same direction.

According to a preferred embodiment, the angular momentum of the vehicle wheel 2 is different from the angular moment of said at least one further rotating member 4, e.g. at least one flywheel. Preferably, the ratio between the angular momentum of the vehicle wheel 2 and the angular momentum of said at least one further rotating member 4 is substantially equal to two, and preferably comprised between two and four, and preferably equal to four. Preferably, the ratio between the angular momentum of said at least one further rotating member 4 and the angular momentum of the vehicle wheel 2 is substantially equal to two, and preferably comprised between two and four, and preferably equal to four. According to an embodiment, said vehicle wheel 2 has a greater diameter and/or radius than said at least one further rotating member 4. According to an embodiment, said vehicle wheel 2 and said at least one further rotating member 4 have substantially the same mass. According to a preferred embodiment, said vehicle wheel 2 and said at least one further rotating member 4 have a different mass, and preferably said vehicle wheel 2 has a greater mass than said at least one further rotating member 4.

According to an embodiment, said at least one further rotating member 4 and/or the parts necessary for its movement are housing in a flywheel housing immersed in a fluid to minimize the friction acting on at least one further rotating member 4 and/or the parts necessary for its movement. For example, said fluid can be in the form of gas, gel, powder, fluid, and a combination of the above. For example, said fluid comprises inert atmosphere, oil, vacuum atmosphere, pressurized atmosphere and a combination of the above. According to an embodiment, said fluid is a lubricant.

According to an embodiment, when the vehicle 40 comprises at least one fork with a fork leg 25, said fork leg 25 is be made of particularly strong material, e.g. quenched and tempered steel, and preferably steel-39-nickel-chromium-molybdenum steel. For example, said fork leg 25 can also be made of steel-C40, steel-39NiCrMo3, steel-42CrMo4, steel-36CrMn5.

According to an embodiment, when the vehicle 40 comprises at least one fork with one fork leg 25 and said at least one further rotating member 4 either rotates or counter-rotates at higher speed than the vehicle wheel 2, and preferably at least twice as fast, it is possible to use a single at least one further rotating member 4 comprising at least one braking surface 5, thus avoiding the need to provide other braking and stopping systems for the wheel 2 and allowing the wheelbase value of the fork to be minimized. The term "fork" can also be understood as "swingarm", and generally any fixing or wheel suspension system of a vehicle 40 equipped with more than one wheel, e.g. a car or a truck.

According to an embodiment, said assembly 1 further comprises a clutch 8 adapted to connect selectively and operatively at least one vehicle wheel 2 to said at least one further rotating member 4.

According to an embodiment, said assembly 1 comprises either additionally or alternatively to the clutch 8, a clutch 108 adapted to connect selectively and operatively said at least one further rotating member 4 to the vehicle chassis 15.

By virtue of the joint provision of said clutch 8 and at least two further rotating members 4, each associated with a braking device 18, e.g. a friction braking device, it is possible to trigger in sequence said at least two further rotating members 4, allowing the adjustment of the braking torque delivered and transmitted to the vehicle wheel 2 in order to brake it, possibly until it stops.

The provision of at least one clutch allows to choose which and how many further rotating members 4 to connect operatively to the vehicle wheel 2, to adjust the gyroscopic force and thus the stabilizing or destabilizing effect on the vehicle 40.

According to a preferred embodiment, not necessarily combinable with all embodiments described above, said assembly 1 comprises at least one kinetic energy recovery device 10, or KERS 10, or inertial motor 10, adapted to store the kinetic energy transmitted to said at least one further rotating member 4 to make it available for subsequent use, said kinetic energy recovery device 10 is operatively connected to said at least one further rotating member 4. In this manner, said at least one further rotating member 4 acts as a flywheel adapted to rotate by inertia in order to store the kinetic energy of the vehicle wheel 2.

According to an embodiment, said assembly 1 comprises at least two further rotating members 4 which act as flywheels so as to form a flywheel pair which can be operatively connected to the vehicle wheel 2. Added masses 29, or radial masses 29, may be placed on said further rotating members 4 to adjust the mass distribution of said further rotating members 4, in order to adjust the resulting gyroscopic effect and to adjust the inertia to the rotation of said further rotating members 4.

According to an embodiment, said at least two further rotating members can be operatively connected by means of at least one further transmission 106 which achieves a transmission ratio. Preferably, said further transmission 106 achieves a negative transmission ratio, so that said at least two further rotating members 4 rotate in opposite direction; in other words, two further rotating members 4 counter-rotate forming a pair of counter-rotating flywheels. In this manner, it is possible to substantially cancel the gyroscopic force resulting from the counter-rotation of said flywheel pair and, at the same time, it is possible to store a given amount of kinetic energy, thus forming an inertial motor. Said at least two further counter-rotating rotating members 4 may be associated with at least one braking device which is not necessarily intended to brake the vehicle wheel 2 by means of a braking action acting on these at least two further rotating members 4, and, for example, this braking device may, be designed to dissipate the rotational kinetic energy stored in said two counter-rotating flywheels.

According to a preferred embodiment, at least one further rotating member 4, e.g. a brake disc, is associated with a braking device 18 and is operatively connected to the vehicle wheel 2 by means of the transmission 6, which transmits a multiplication and rotation reversal ratio, e.g. a transmission ratio substantially equal to −2. A clutch 8 may be interposed between said first further rotating member 4, e.g. a brake disc, and at least one further pair of further rotating members 4, e.g. a pair of flywheels. The flywheels forming said pair can be operatively connected to each other by means of a further transmission 106 which achieves a negative transmission ratio, so that said two flywheels rotate in opposite direction. In this manner, it is possible to cancel the gyroscopic force resulting from the counter-rotation of the flywheel pair and, at the same time, it is possible to store a given amount of kinetic energy, thus forming an inertial motor. For example, the gyroscopic force of said first further rotating member 4, e.g. a brake disc, will at least partially balance that of vehicle wheel 2 making the vehicle 40 more agile and said pair of counter-rotating flywheels will not bias the handling of vehicle 40. For example, in this manner, when the angular speed of the first further rotating member 4, e.g. a brake disc, is greater than the angular speed of the flywheel pair, it is possible to couple the clutch 8 to put the pair of further flywheels 4 into rotation, subtracting kinetic energy from the vehicle wheel 2, thus slowing down the vehicle 40. For example, in this manner, when the angular speed of the first further rotating member 4, e.g. a brake disc, is less than the angular speed of flywheel pair 4, it is possible to couple the clutch 8 to accelerate the first further rotating member 4 e.g. a brake disc, providing rotational kinetic energy to the wheel 2, thus accelerating the vehicle 40. For example, when during a slowing down of the vehicle 40, the clutch 8 is coupled and the angular speed of the first further rotating member 4 is equal to that of the flywheel pair, it is possible to decouple said clutch 8 and use the braking device 18 of the first rotating member 4 so as to slow down further until stopping the rotation of the vehicle wheel 2; in such a condition, the pair of counter-rotating flywheels will not bias the handling of the vehicle 40. For example, with the vehicle 40 stationary, when the angular speed of the first further rotating member 4, e.g. a brake disc, is zero and the angular speed of the counter-rotating flywheel pair is greater than zero, said clutch 8 can be coupled to transmit a rotation starting motion to the vehicle wheel 2.

According to an embodiment, said vehicle wheel 2 and said at least one further rotating member 4 form an electrical machine 12. Preferably, either one of said vehicle wheel 2 or said at least one further rotating member 4 forms the rotor of the electrical machine and the other of either said vehicle wheel 2 or said at least one further rotating member 4 forms the stator of the electrical machine.

Wiring 46 may be provided to collect the electrical energy generated by the electrical machine 12, which can, therefore, act as an electrical generator and lead it into an electrical accumulator.

Wiring 46 can be provided to convey electrical energy to the electrical machine 12 which can, therefore, act as an electrical motor to move the vehicle wheel 2.

According to a preferred embodiment, said assembly 1 comprises a rim body 42 which forms a casing containing at least one further rotating member 4, thus forming an in-wheel solution.

Either alternatively or additionally, said casing formed by the rim body 42 of said assembly 1 houses at least one further rotating member 4 and at least one braking device 18 acting on said further rotating member 4 to brake said vehicle wheel 2, possibly until it stops, so as to form an in-wheel braking device.

Either alternatively or additionally, said casing formed by the rim body 42 of said assembly 1 houses at least one portion of a kinetic energy recovery device 10, e.g. a flywheel formed by said at least another rotating member 4 connected to a clutch 8 to connect and disconnect it to the vehicle wheel 2, forming an in-wheel inertial motor.

Either alternatively or additionally, said casing formed by the rim body 42 of said assembly 1 houses said electrical machine 12, forming an in-wheel electrical motor.

Figure 3:
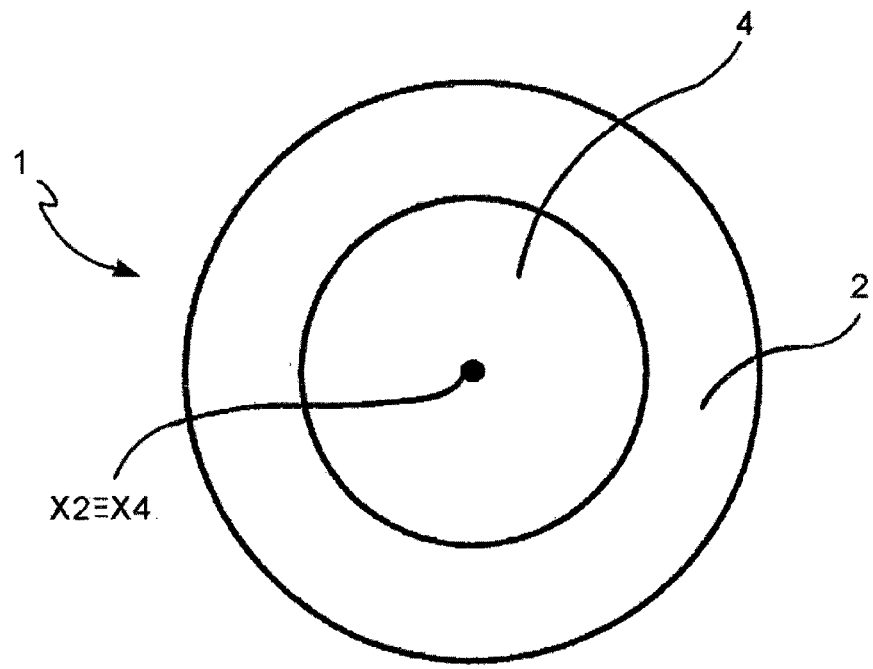
FIG. 3 A diagrammatically shows an assembly, according to an embodiment.
Figure 3:
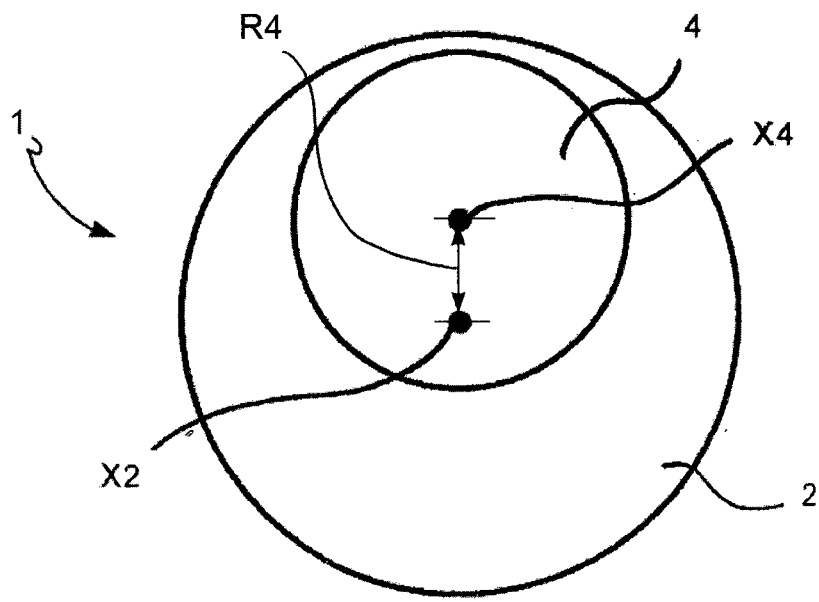
Figure 4:
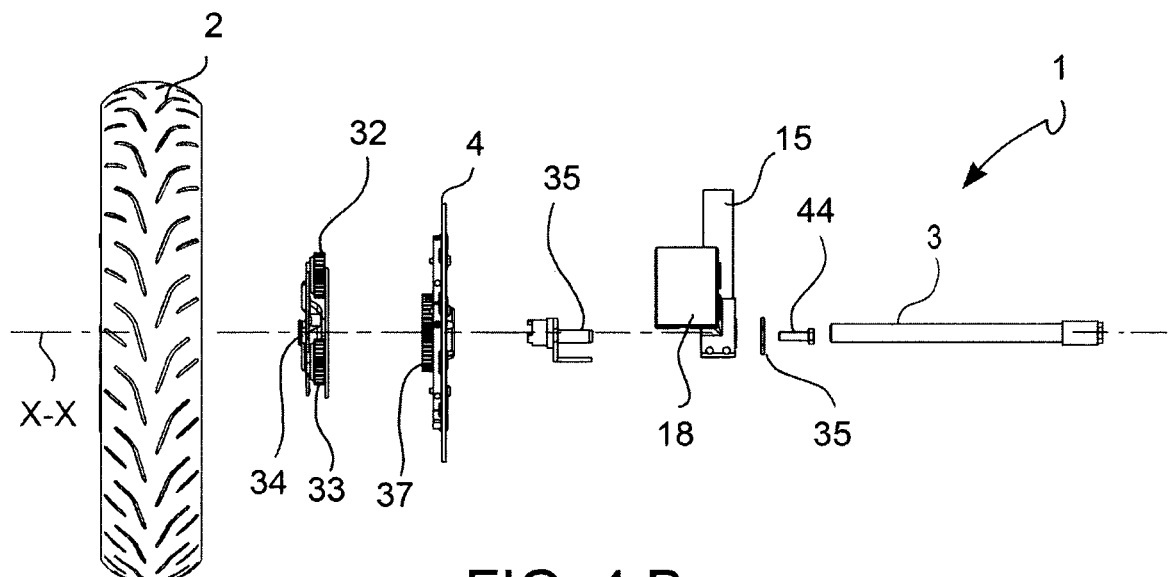
FIG. 4 A is an axonometric view with parts separated of an assembly, according to an embodiment.
Figure 4:
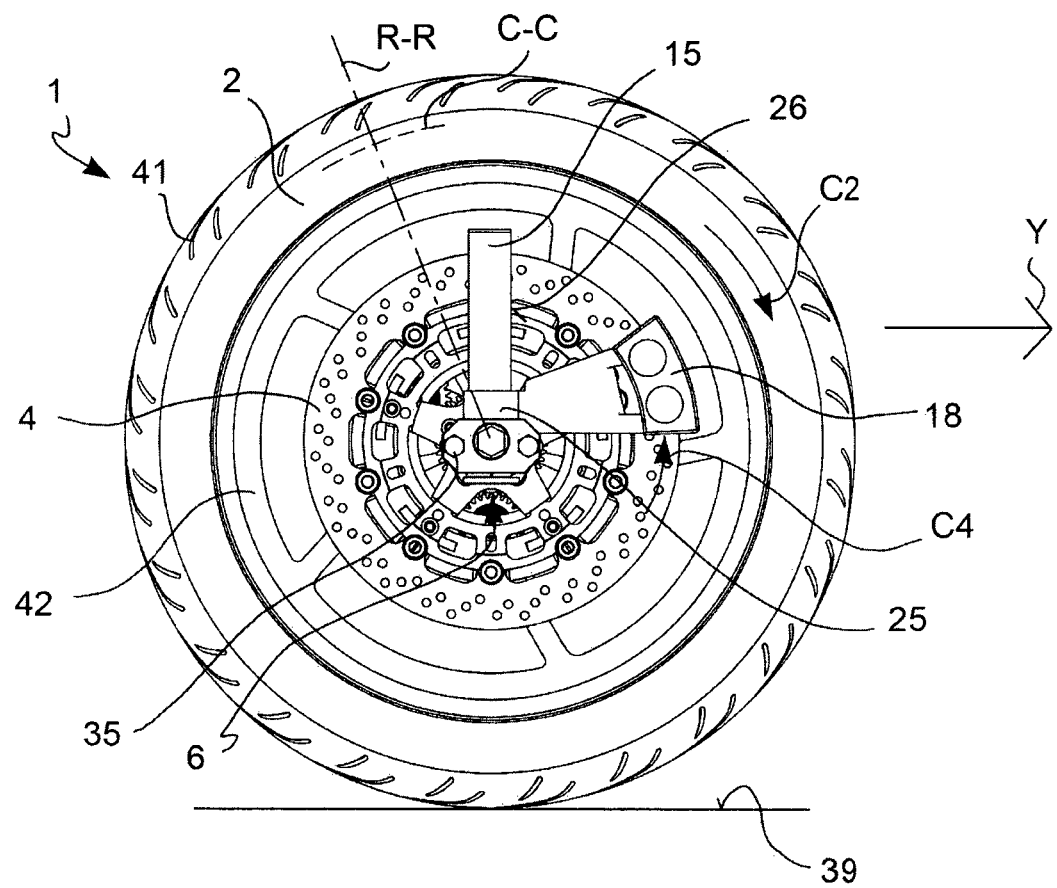

According to an embodiment, e.g. as shown in FIG. 3-A, said assembly 1 comprises a vehicle wheel 2 connected operatively and coaxially to at least one further rotating member 4, so that the wheel rotation axis X2 and the further rotating member rotation axis X4 substantially coincide.

According to an embodiment, e.g. as shown in FIG. 3-B, said assembly 1 comprises a vehicle wheel 2 connected operatively and eccentrically to at least one further rotating member 4, so that the wheel rotation axis X2 and the further rotating member rotation axis X4 are radially distanced by a predetermined radial distance R4.

Figure 5A:
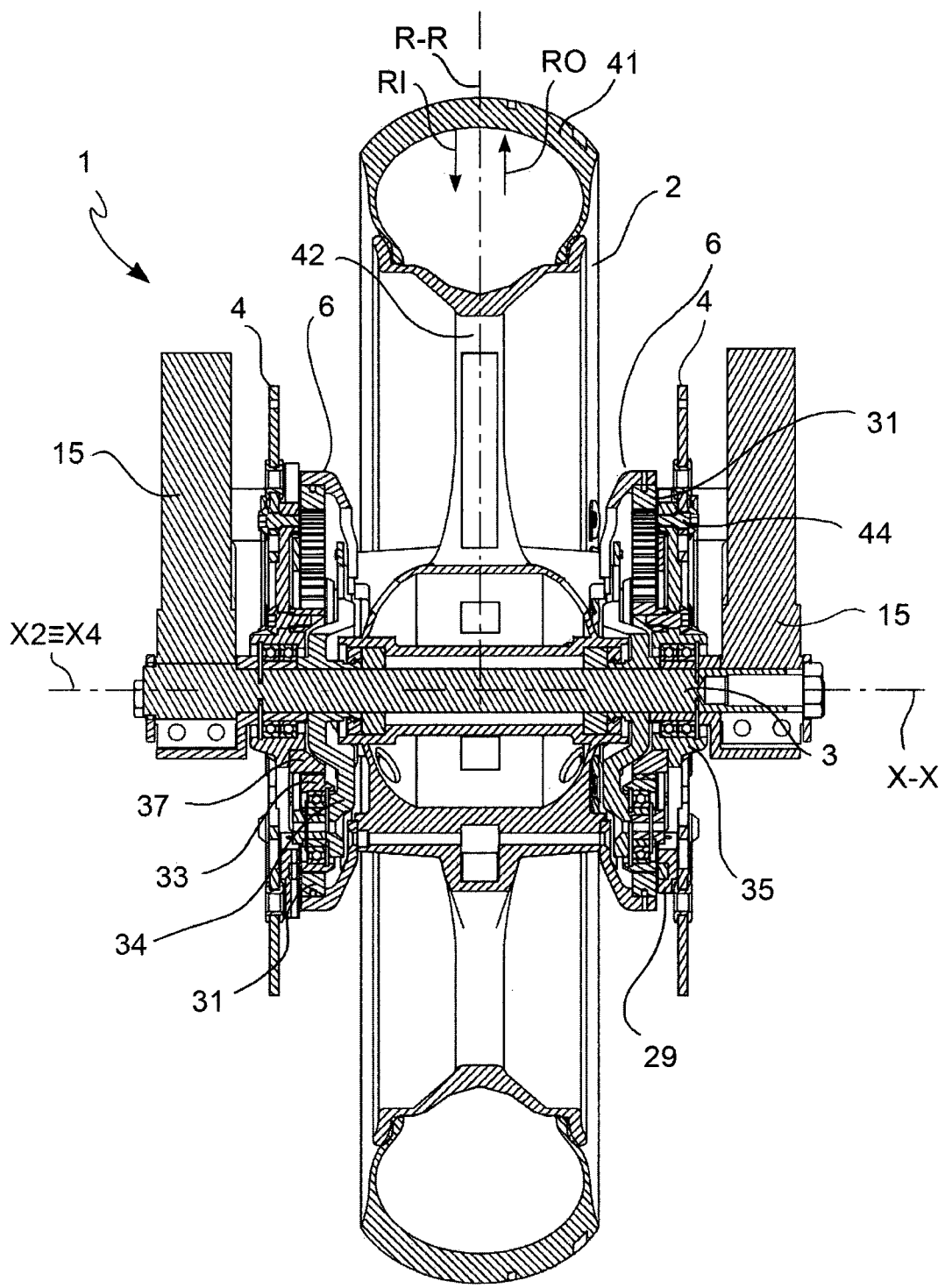
FIG. 5 A is a cross-section view taken along an axial-radial plane which shows an assembly, according to an embodiment.
Figure 5:
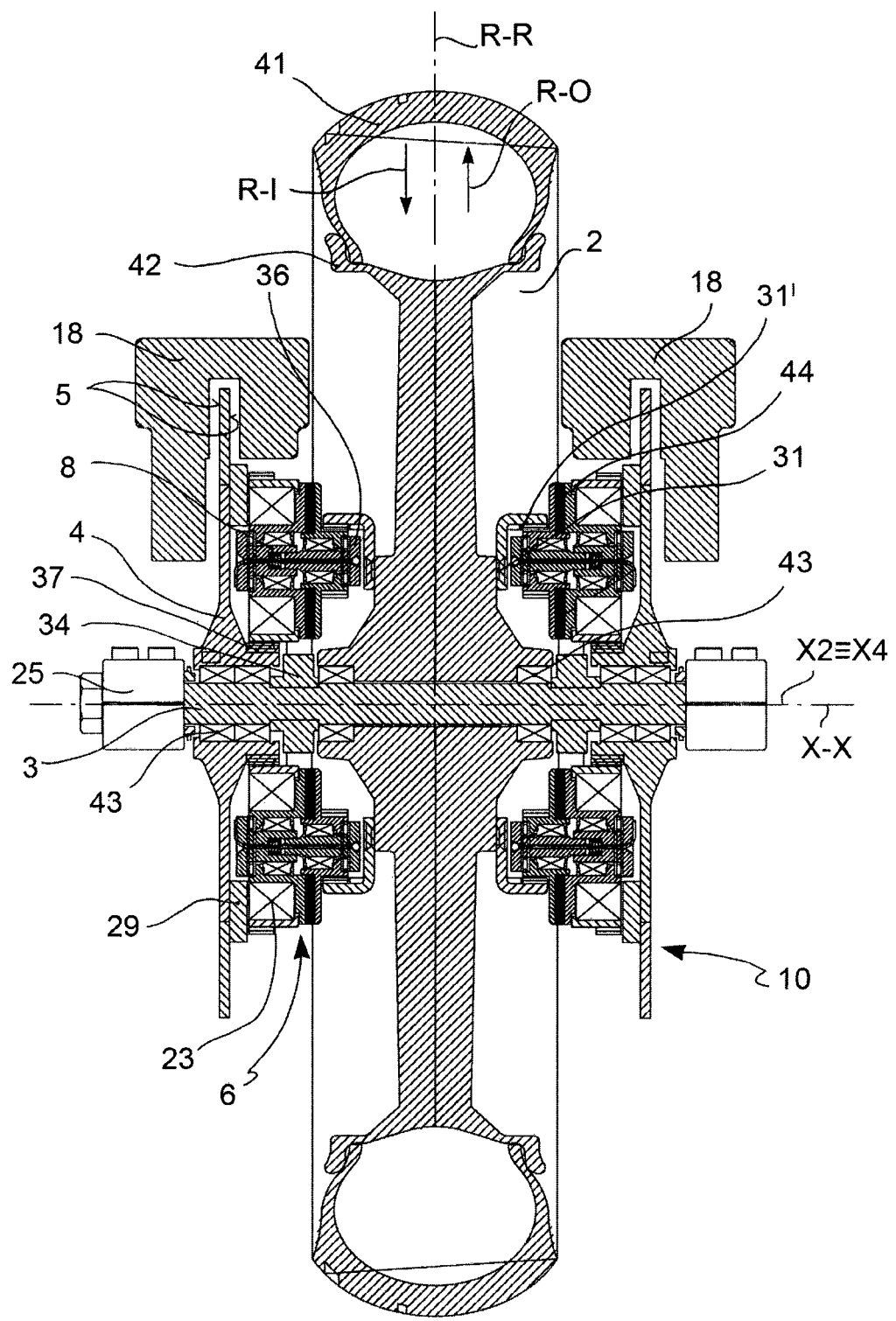

According to an embodiment, as shown for example in FIG. 5-A, said assembly 1 comprises a vehicle wheel 2 operatively connected to two further rotating members 4 arranged coaxially to the vehicle wheel 2 and on opposite sides of the vehicle wheel 2 in axial direction X-X by means of a transmission 6 associated with each of the two further rotating members 4 and which achieves a transmission ratio different from +1, wherein said assembly 1 comprises a friction braking device 18 (not shown) associated with each of the two further rotating members 4 to brake the vehicle wheel 2, possibly until it stops. The friction braking device 18 may comprise at least one service brake caliper adapted to be arranged straddling at least one further rotating member 4 having braking surfaces 5 facing the axial direction X-X. The friction braking device 18 may comprise at least one pair of drum brake shoes adapted to press against at least one braking surface 5 of at least one further rotating member 4, wherein said braking surface 5 faces the inner radial direction RI towards the rotation axis X2, X4. The friction braking device 18 may comprise at least one pad adapted to press against at least one braking surface 5 of at least one further rotating member 4. The embodiment shown here can be considered for retrofitting because the braking surfaces 5, in this case, are provided on a brake disc to brake the vehicle wheel 2 possibly until it stops. Each transmission 6 may achieve a negative transmission ratio so that the two further rotating members 4 rotate in a mutually concordant direction and in a discordant direction with respect to the vehicle wheel 2 so that the resulting gyroscopic force has a destabilizing effect on the vehicle 40. Each transmission 6 may achieve a positive transmission ratio so that the two further rotating members 4 rotate in a mutually concordant direction and in a concordant direction with respect to the vehicle wheel 2, so that the resulting gyroscopic force has a hyperstabilizing effect on the vehicle 40, e.g. adapted for applications on scooters having rims 42 of relatively small radius. The gyroscopic effect resulting from the rotation of each further rotating member 4 can be increased and/or adjusted and/or balanced by adopting/removing added masses 29 or radial masses 29.

According to an embodiment, e.g. as shown in FIG. 5-B, said assembly 1 comprises a vehicle wheel 2 operatively connected to two further rotating members 4 arranged coaxial to the vehicle wheel 2 and on the sides of the vehicle wheel 2 opposite in the axial direction X-X by means of said transmission 6 which achieves a transmission ratio different from +1, wherein said assembly 1 comprises a friction braking device 18, e.g. a brake caliper, associated with each of the two further rotating members 4 to brake vehicle wheel 2, possibly until it stops, and wherein a clutch 8 is provided to connect and disconnect selectively and operatively said vehicle wheel 2 from each of these further rotating members 4 so that these further rotating members 4 can form a kinetic energy recovery device 10. Added masses 29 or radial masses 29 can be installed on or removed from the further rotating member 4, which can act both as brake disc and flywheel. The transmission 6 may comprise an ratchet wheel 23 or the like which allows the rotation of the further rotating member 4 in one direction only. Each transmission 6 may comprise a gear train, e.g. a planetary gear set, having a planet carrier 34 integral in rotation with the wheel axle 3, which is integral, in turn, with the vehicle chassis 15, e.g. a fork leg 25 of a motorcycle, and a ring gear carrier 31' integral in rotation with the rim body 42 and thus to the vehicle wheel 2. The transmission ratio achieved by transmission 6 is preferably greater than 1 in absolute value, i.e. greater than 6 in absolute value, e.g. greater than +6 or less than −6. The transmission ratio may also be greater than 10 in absolute value.

A person skilled in the art will appreciate that a continuously variable speed drive or CVT can be provided in order to increase the transmission ratio in absolute value.

Figure 6:
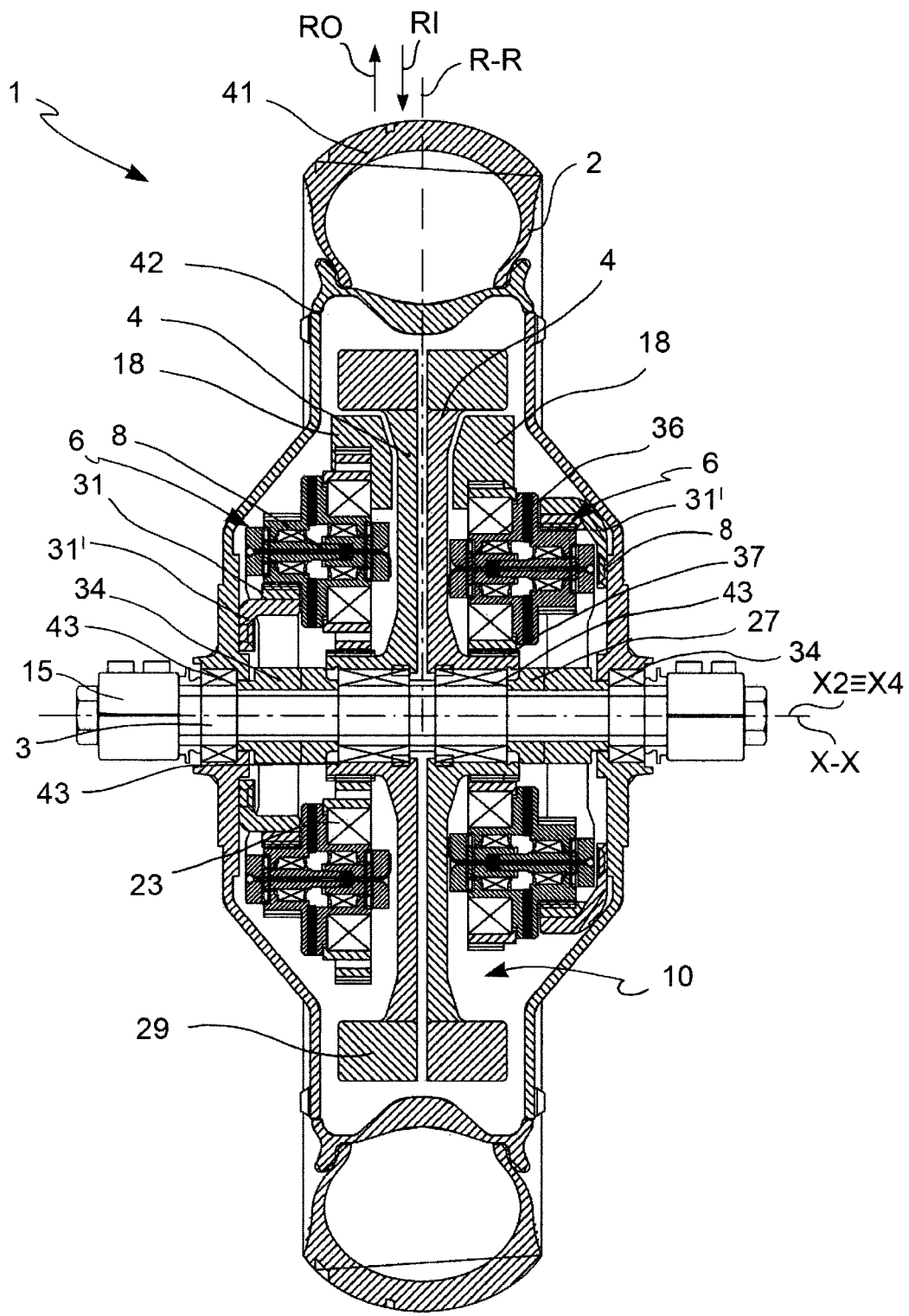
FIG. 6 A is a cross-section view taken along an axial-radial plane which shows an assembly, according to an embodiment.
Figure 6:
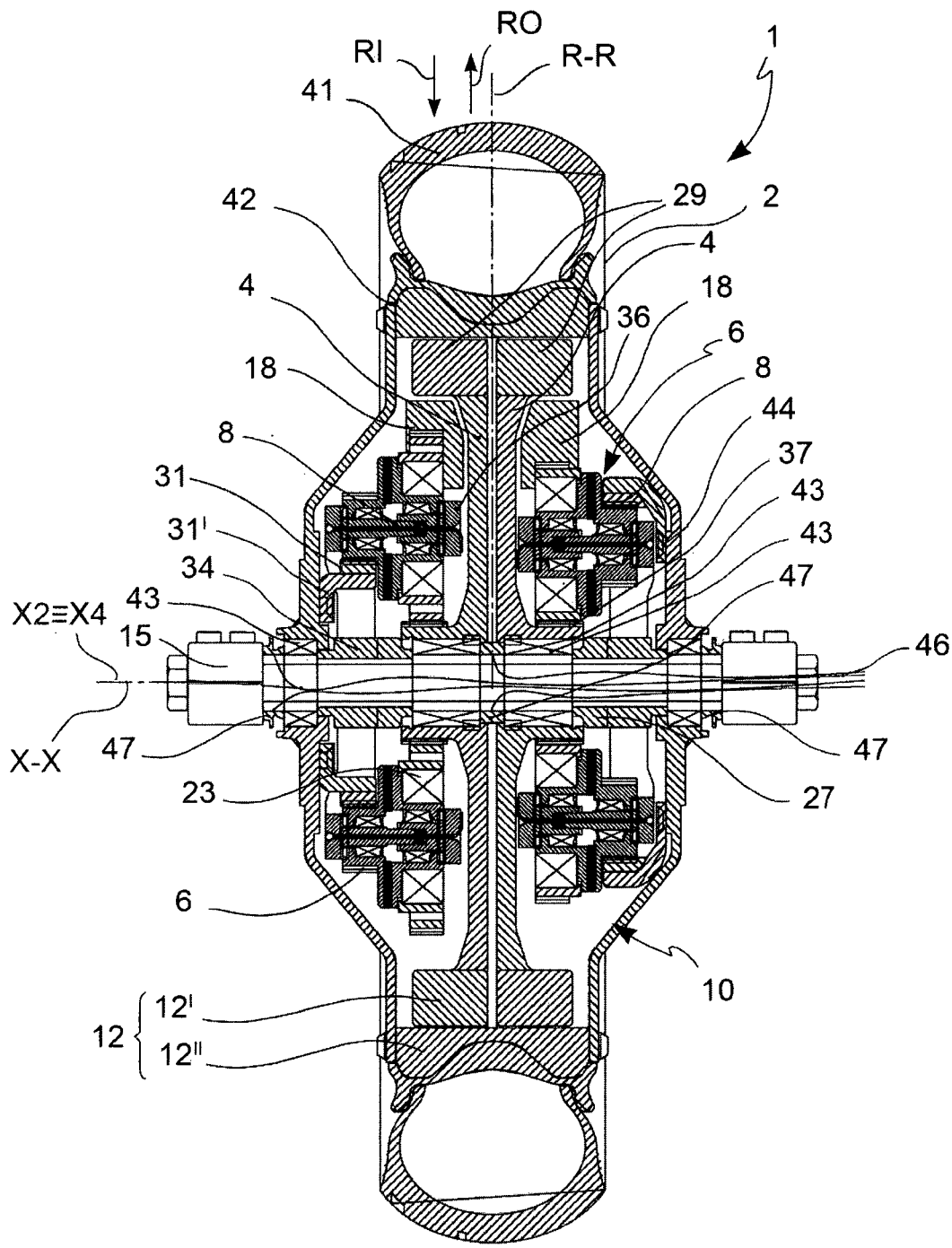

According to an embodiment, e.g. as shown in FIG. 6-A, said assembly 1 comprises a vehicle wheel 2, operatively connected to two further rotating members 4 which form a kinetic energy recovery device 10 and are arranged coaxially to vehicle wheel 2 each by means of a transmission 6, so that the two further rotating members 4 reciprocally counter-rotate in order to compensate, at least in part, the resulting gyroscopic force generated by the two further rotating members 4, and wherein a friction braking device 18 is associated with each of the two further counter-rotating rotating members 4 in order to brake the vehicle wheel 2, possibly until it stops, and wherein the rim body 42 of the vehicle wheel 2 forms a casing which houses said at least two rotating members 4, and in which at least one clutch 8 is provided to connect and disconnect selectively each further rotating member 4. In this manner, the further rotating members 4 act both as a flywheel and as a brake disc. Added masses 29 or radial masses 29 may be provided on said further rotating members 4. Each transmission 6 may comprise a gear train, e.g. a planetary gear set, having a planet carrier 34 integral in rotation with the wheel axle 3, and thus to the vehicle chassis 15, and a ring gear carrier 31' integral in rotation with the rim body 42, and thus to the vehicle wheel 2.

According to an embodiment, e.g. as shown in FIG. 6-B, an assembly 1 on the embodiment shown in FIG. 6-A may further comprise an electrical machine 12 formed by at least one further rotating member 4 and said vehicle wheel 2, e.g. the rim body 42, so that one of either said further rotating member 4 or said vehicle wheel 2 forms a first portion of electrical machine 12' and the other of either said further rotating member 4 and said vehicle wheel 2 forms a second portion of electrical machine 12" rotationally associated with said first portion of electrical machine 12'. In this manner, said at least one further rotating member 4 acts as brake disc, as flywheel and as rotor/stator. Sliding or inductive contacts 47 and/or wiring 46 may be provided, e.g. arranged inside the body of the wheel axle 3 which is integral with the chassis 15 of the vehicle 40. The added masses 29 may comprise a battery so as to store electrical energy generated by said electrical machine 12 and at the same time allow the mass to be adjusted to a certain radial height of at least one further rotating member 4. The added masses 29 can act as a portion 12" or 12"' of electrical machine 12.

Figure 7:
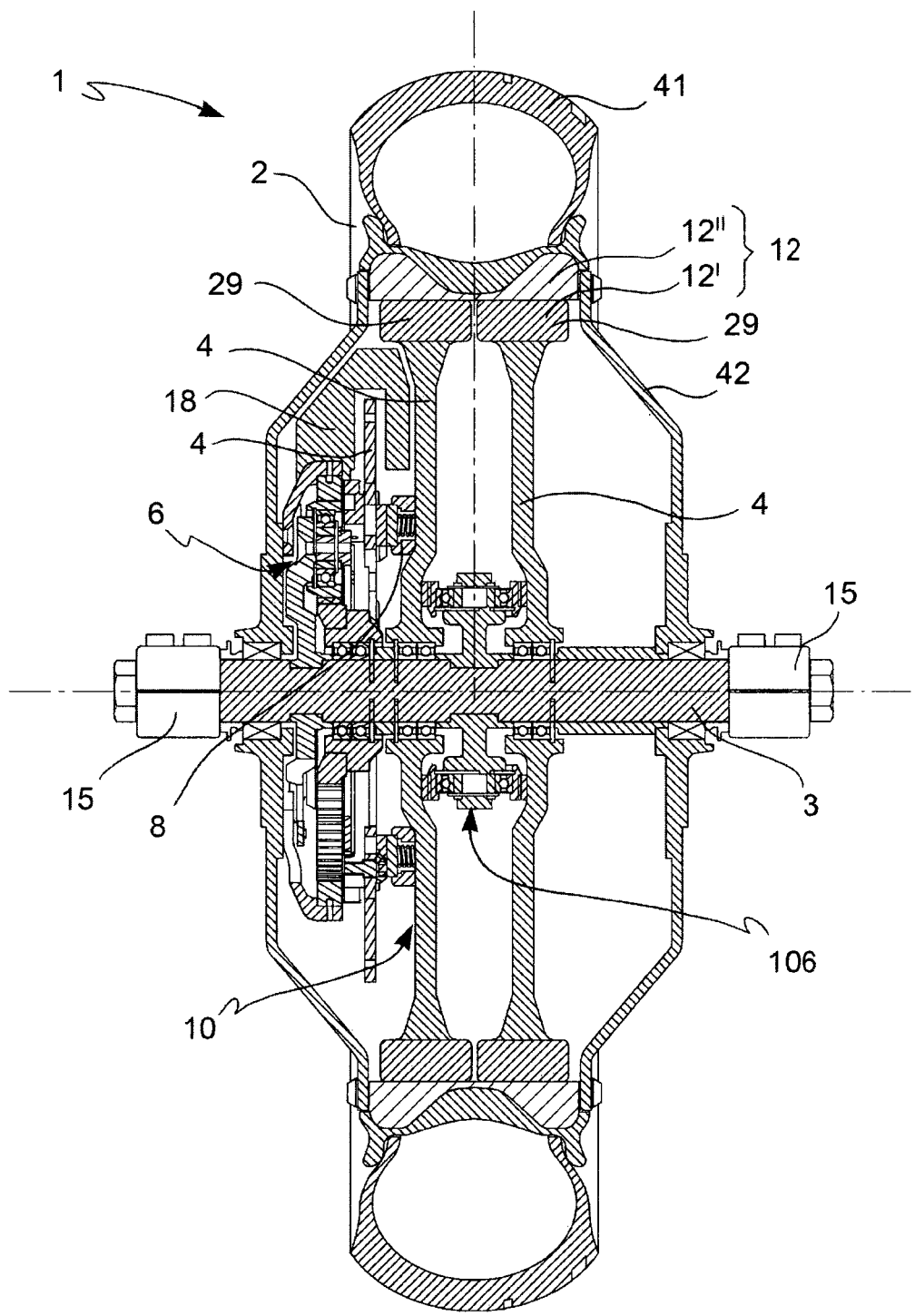
FIG. 7 A is a cross-section view taken along an axial-radial plane which shows an assembly, according to an embodiment.
Figure 7:
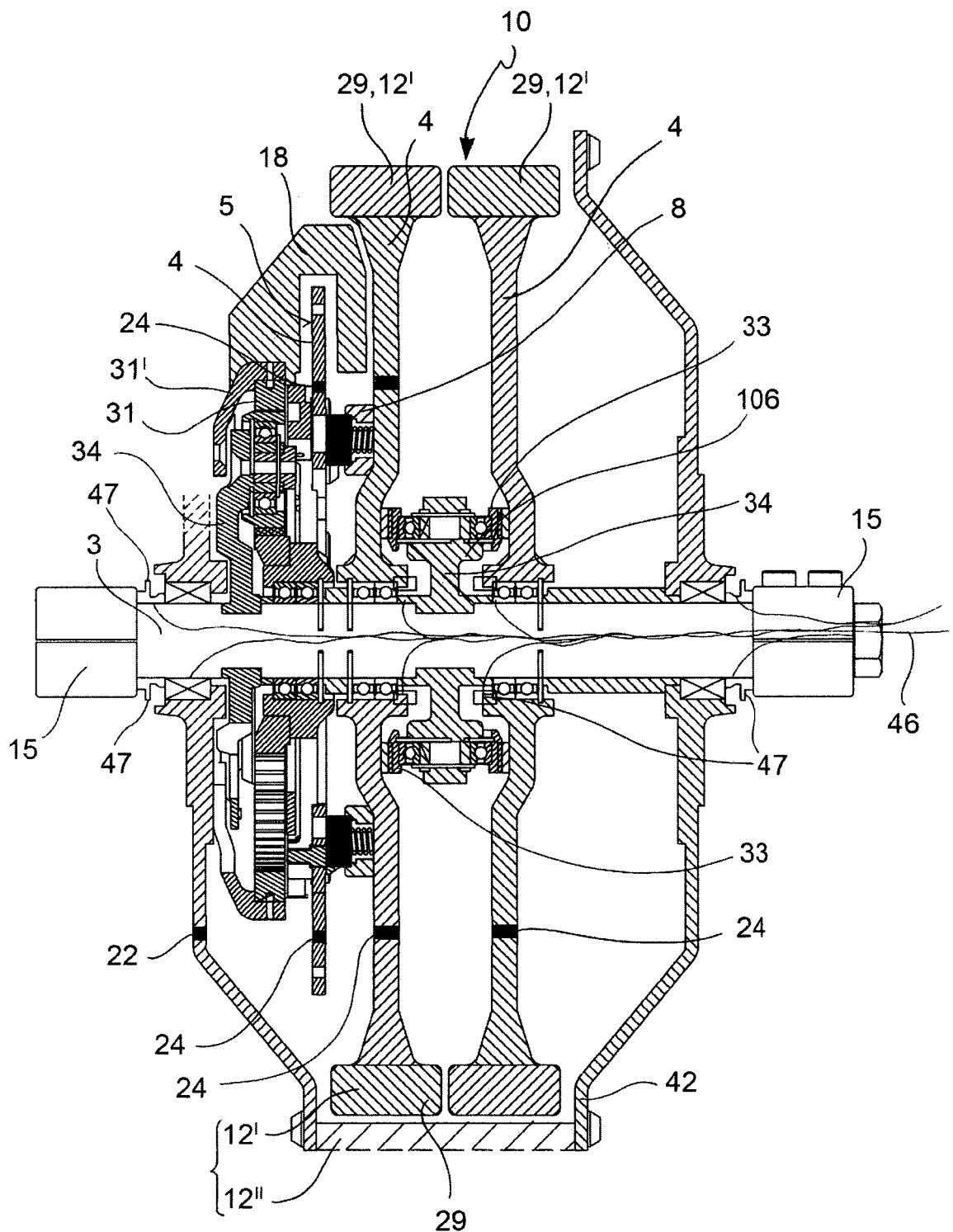

According to an embodiment, e.g. as shown in FIG. 7-A and FIG. 7-B, said assembly 1 comprises a vehicle wheel 2 and a plurality of further rotating members 4, wherein a transmission 6 achieves a transmission ratio different from +1 between a further rotating member 4 acting as a brake disc associated with a friction braking device 18 and said vehicle wheel 2, and wherein a pair of further rotating members acting as flywheels are connected selectively and operatively to said further rotating member 4 associated with said friction braking device 18 by means of a clutch 8, and wherein a further transmission 106 operatively connects the further rotating members of said pair of further rotating members 4 achieving a negative transmission ratio. An electrical machine 12 may be provided consisting of said pair of further rotating members 4 and said vehicle wheel 2, e.g. rim body 42. Phonic wheels of wheel 22 and of a further rotating member 24 may be provided. In the example shown in FIG. 7-B, a part of the rim body 42 is transparent for the sake of clarity, and the transmission 6 comprises a ring gear carrier 31' integral in rotation with the rim body 42, a planet carrier 34' integral with the wheel axle 3 and thus with the vehicle chassis 15, e.g. a motorcycle fork leg 25, and wherein the further transmission 106 comprises a planet carrier 34 integral with the wheel axle 3 and achieves a transmission ratio, preferably equal to −1, so that the flywheels of the pair of further rotating members 4 mutually counter-rotate in order to compensate at least partially the resulting gyroscopic force generated by the two further rotating members themselves, canceling or almost canceling their bias on the gyroscopic balance of the assembly 1. The clutch 8 may be associated with a further transmission which may comprise a continuously variable speed drive or CVT. The rotation of the further rotating member 4 which acts as a brake disc may generate a gyroscopic force having a destabilizing effect on the vehicle 40, e.g. adapted to at least partially compensate the gyroscopic force generated by the vehicle wheel 2 making the vehicle 40 agile. According to an embodiment, at least one further transmission 6 operatively connects at least one further rotating member 4 associated with at least one braking device 18 with respect to said pair of said further rotating members 4 of said plurality of further rotating members coupled by the transmission 106.

Figure 8A:
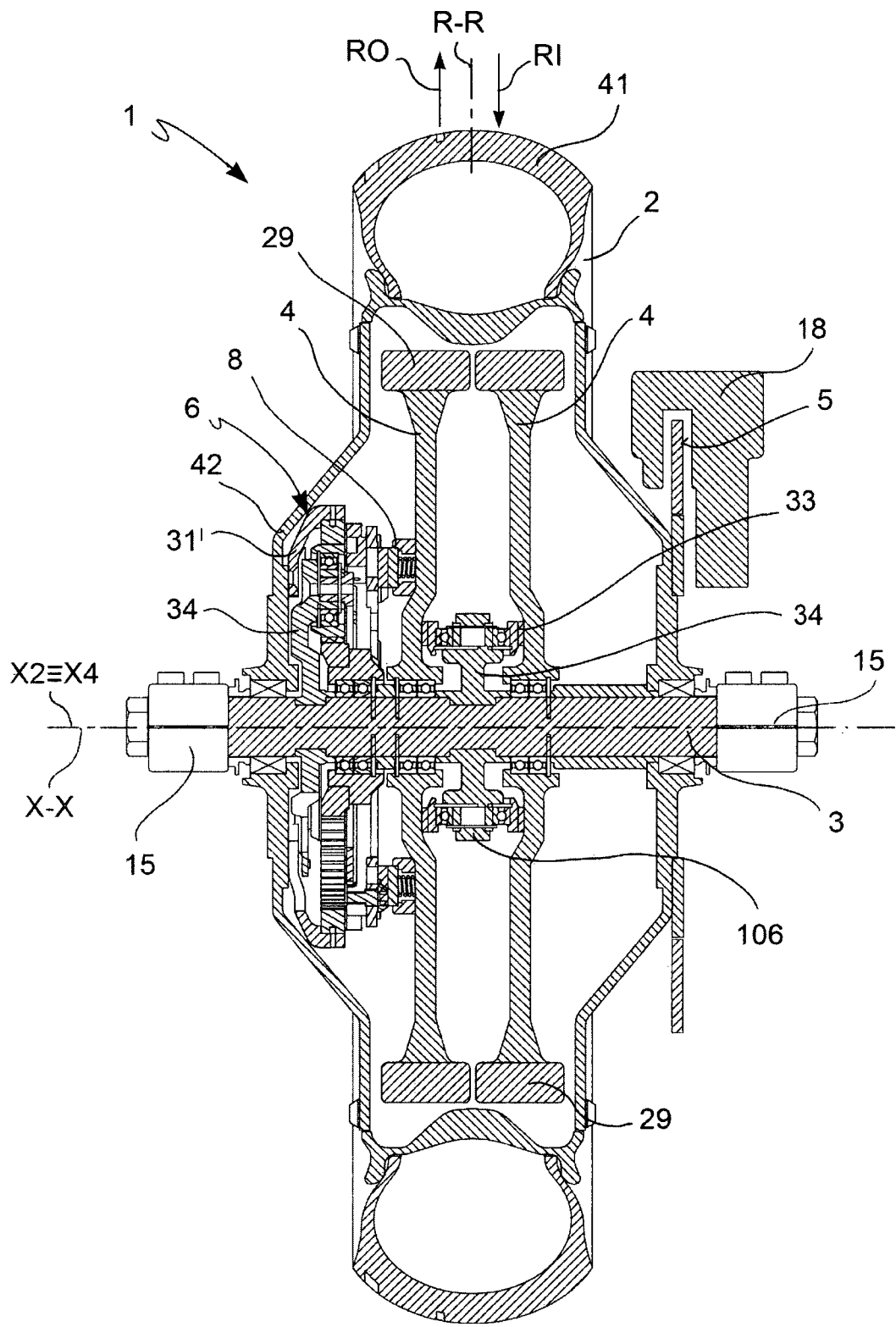
FIG. 8 A is a cross-section view taken along an axial-radial plane which shows an assembly, according to an embodiment.
Figure 8:
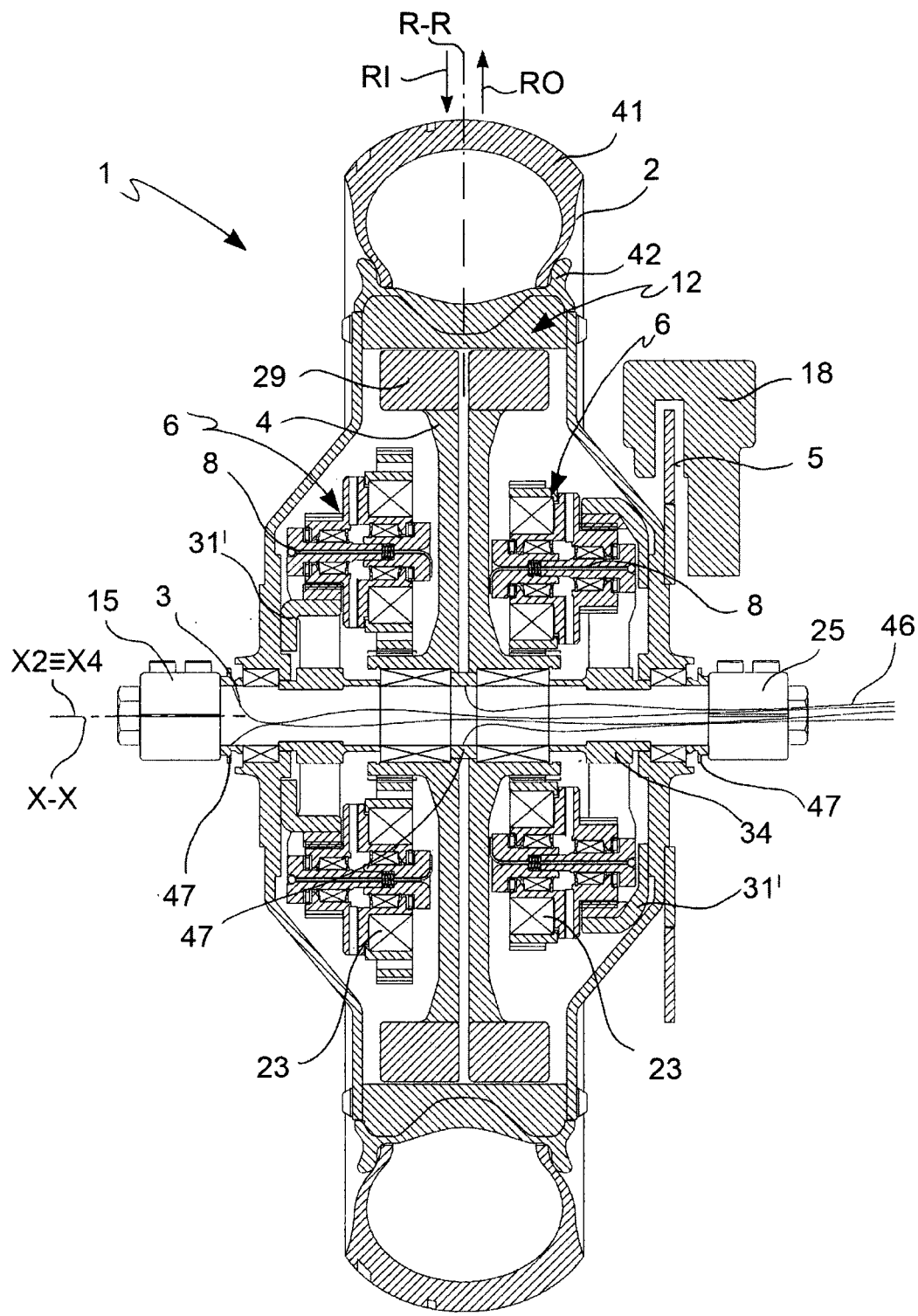

According to an embodiment, e.g. as shown in FIG. 8-A, said assembly 1 comprises a vehicle wheel 2 operatively connected to a pair of further rotating members 4 by means of a transmission 6 which achieves a transmission ratio different from +1 and wherein a clutch 8 operatively connects said transmission 6 to said pair of further rotating members 4 which act as flywheels forming a kinetic energy recovery device 10, and wherein a further transmission 106 operatively connects said further rotating members 4 to each other, thereby achieving a negative transmission ratio, e.g. equal to −1, in order to compensate, at least partially, and preferably cancel out, the resulting gyroscopic force generated by said pair of counter-rotating flywheels, and wherein the rim body 42 of the vehicle wheel 2 forms a casing which encloses said further rotating members thus forming an in-wheel inertial motor. A brake disc and a friction braking device 18 are provided integral with the vehicle wheel 2 to the brake vehicle wheel 2, possibly until it stops.

According to an embodiment, e.g. as shown in FIG. 8-B, said assembly 1 comprises a vehicle wheel 2 which can be operatively connected to a pair of further rotating members 4 by means of a pair of transmissions 6 each associated with a clutch 8, wherein a transmission 6 achieves a negative transmission ratio so that said further rotating members 4 counter-rotate in order to compensate at least partially the resulting gyroscopic force generated by said pair of counter-rotating flywheels. An electrical machine 12 may be formed at least by a further rotating member 4 and by said vehicle wheel 2, e.g. the rim body 42.

Figure 9:
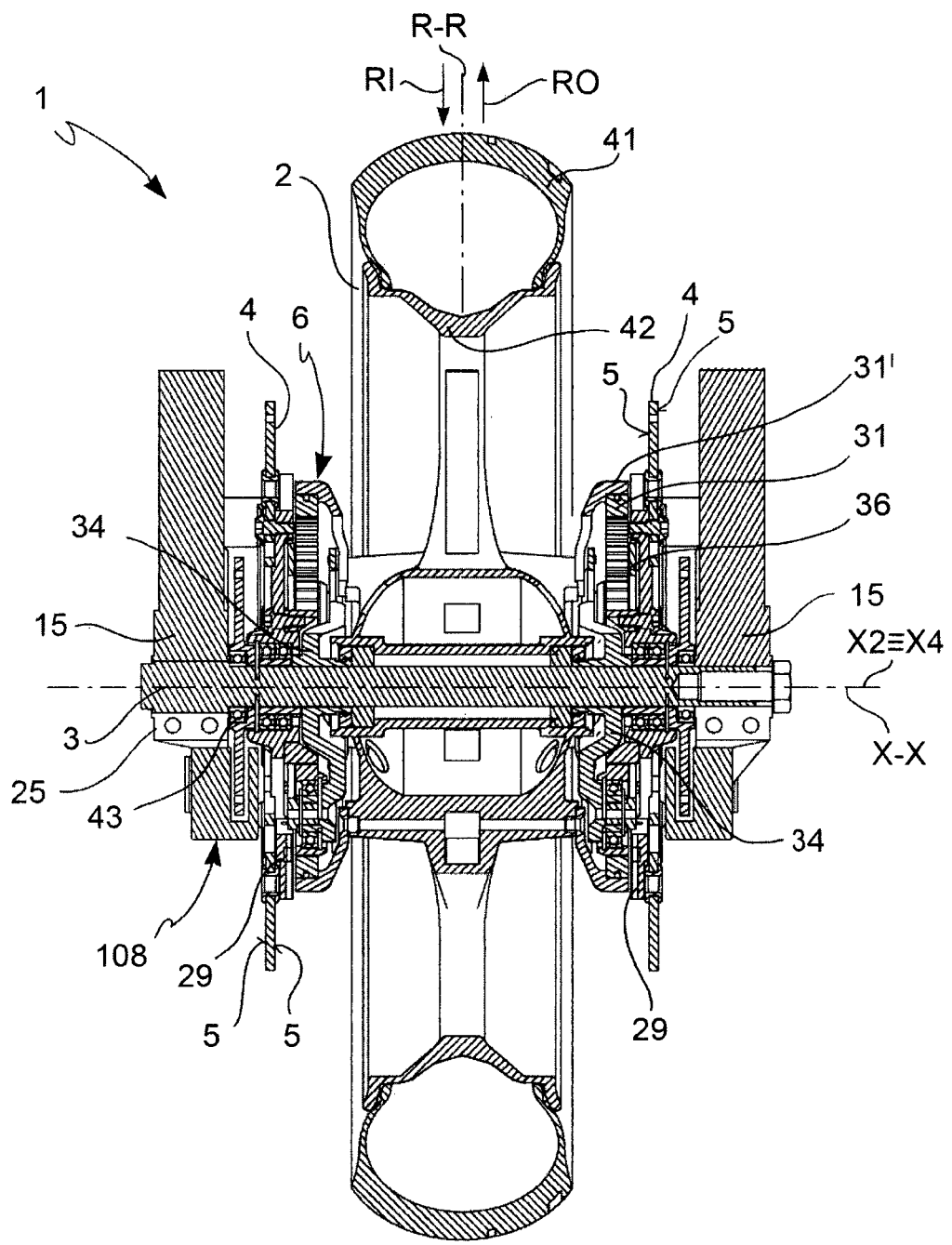
FIG. 9 A is a cross-section view taken along an axial-radial plane which shows an assembly, according to an embodiment.
Figure 9:
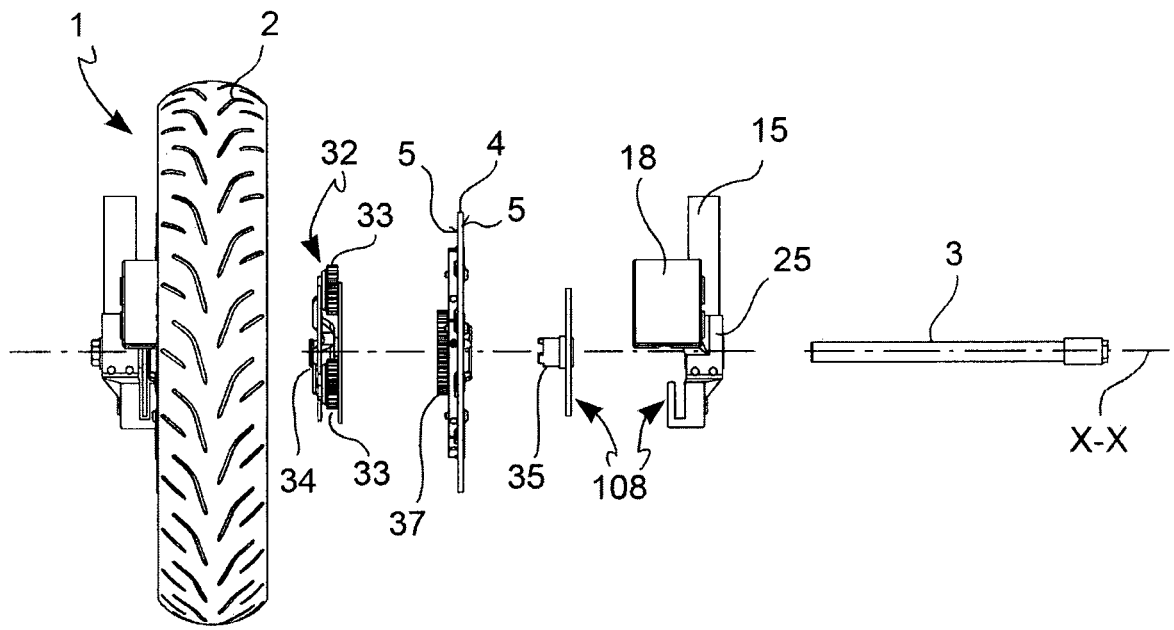
Figure 9:
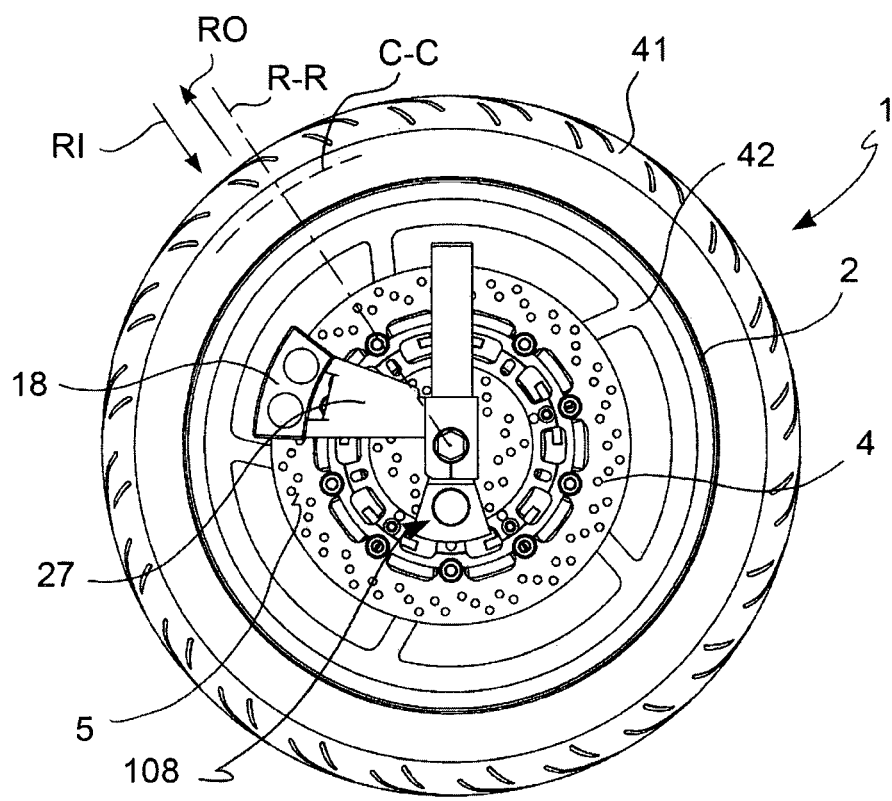

According to an embodiment, e.g. as shown in FIG. 9-A, FIG. 9-B and FIG. 9-C, said assembly 1 comprises a vehicle wheel 2, at least one further rotating member 4 which can be operatively connected to vehicle wheel 2 by means of a transmission 6 which achieves a transmission ratio different from +1, at least one friction braking device 18 acting on at least one further rotating member 4, and at least one clutch 108 which selectively consolidates the transmission 6, preferably the planet carrier 34 of the gear train, e.g. a planetary gear set, of the transmission 6, with the vehicle chassis 15. In the example shown, said clutch 108 comprises a brake disc integral with said planet carrier 34 and a brake caliper integral with the vehicle chassis 15 but may alternatively or additionally may comprise a double-disc clutch, and/or a centrifugal clutch, and/or a clutch controlled manually or by means of an electronic control device.

In working conditions, an assembly 1 e.g. as shown in FIG. 9-A, FIG. 9-B and FIG. 9-C, when the clutch 108 operatively decouples said vehicle chassis 15 and said transmission 6, the further rotating member 4 and said planet gear set 32 are fed by the vehicle wheel 2 and rotate in agreement with vehicle wheel 2, generating a gyroscopic force which has a hyper-stabilizing effect on the vehicle 40, e.g. suited when the vehicle 40 is a motorcycle traveling at slow forward speeds. When the clutch 108 mutually consolidates the chassis 15 and the planet carrier 34 of the transmission 6, said further rotating member 4 counter-rotates With respect to the vehicle wheel 2 with a preferably high transmission ratio, e.g. less than −6 and is adapted to act as a brake disc associated with a friction braking device 18. In this manner, the gyroscopic force generated by the further rotating member 4 counter-rotating with respect to the vehicle wheel 2 is adapted to provide a destabilizing effect on the vehicle 40 which mounts said assembly 1, e.g. suited for fast forward speeds and/or braking aimed at braking the vehicle wheel 2, possibly until it stops. The clutch 108 may preferably be controlled by an electronic control device. A person skilled in the art will appreciate that when the clutch 108 is triggered, i.e. when the clutch 108 mutually consolidates the chassis 15 and the planet carrier 34 of the transmission 6, a braking effect will also be achieved on the vehicle wheel 2, which is however unsuitable for stopping it. The clutch 108 when triggered, i.e. when clutch 108 makes the chassis 15 and the planet carrier 34 of the transmission assembly 6 integral, substantially acts as a selectively operated anti-rotation device 35.

Figure 10:
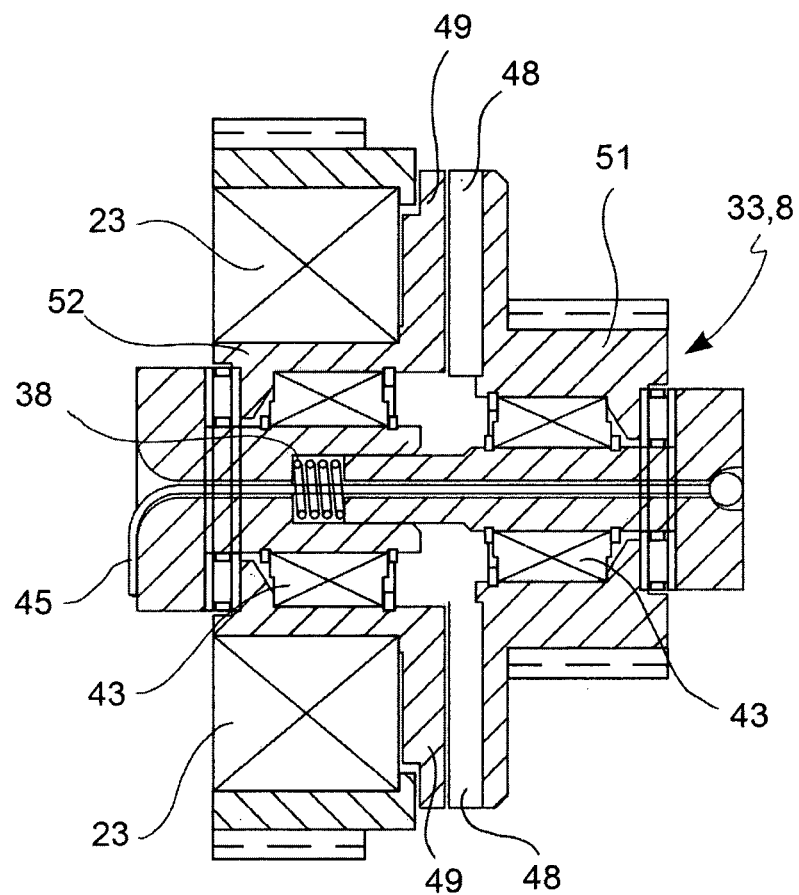
FIG. 10 is a section view of a clutch and of a planet gear of a transmission, according to an embodiment.

According to an embodiment, e.g. as shown in FIG. 10, a clutch 8, 108 comprises a first portion 51 and a second portion 52 adapted to come into contact with each other when the clutch is actuated by a clutch actuation device 45, e.g. a Bowden cable which overcomes the elastic force generated by a friction spring 38. Friction material 48 can be arranged on the first portion 51 of the clutch to come into contact with a friction abutment portion 49 of the second portion 52. In the embodiment represented by said clutch 8, there is also a planet gear 33 of the transmission 6 which has the gear toothing on both the first portion 51 and the second portion 52, said planet gear can be used for high ratios, e.g. higher than 8 in absolute.

According to an embodiment, said clutch 8, 108 can be actuated by means of a manually actuated control device. In other words, said assembly 8, 108 comprises at least one manual control and actuation system of said at least one clutch 8, 108. For example, said clutch 8, 108 can be actuated by means of a control button and/or a control lever and/or a control pedal. For example, said clutch 8, 108 can be actuated by a thumb control.

According to an embodiment, said clutch 8, 108 can be actuated by means of an automatically operated control device, e.g. in response to the detection of a variable vehicle status 40 which can be associated with said assembly 1.

According to an embodiment, said assembly 1 further comprises a control and actuation detection system unit 20, adapted to detect state information of the vehicle 40 and process said information on the state of the vehicle 40 to transmit control signals to said at least one clutch 8, 108 in an automatic manner. The detection, control and actuation system 20 can also transmit control signals to said braking device 18.

According to an embodiment, said control and actuation detection system 20 comprises at least one inertial platform, adapted to detect dynamic parameters of the vehicle 40 which can be associated with said assembly 1. Preferably, said inertial platform of the control and actuation detecting device 20 comprises one or more gyroscopes and/or one or more accelerometers. For example, said inertial platform is adapted to detect the rolling inclination and/or yaw of the vehicle 40 with respect to the road surface substantially in real-time, as well as the instantaneous amount of acceleration to which the vehicle 40 or parts thereof is subjected, by way of non-limiting example during braking and/or starting from a standstill. Preferably, the term "inertial platform" means a detection system of the inertial measurement unit or IMU type, preferably comprising one or more micro-electro-mechanical sensors or MEMS. In this manner, said control and actuation detection system 20 can transmit control signals to said clutch 8, 108 and preferably also to said braking device 18, on the basis of the information detected by said inertial platform substantially in real-time. For example, said inertial platform sends information on the parameters of the vehicle 40 to the data processing unit of the control system, such as, for example, relative spatial position with respect to a predefined reference, instantaneous angular speed and rotation direction of the vehicle wheel 2 and/or said wheel at least one further rotating member 4 and/or of said anti-rotation system 35, e.g. when turning, instantaneous rolling angle, instantaneous angular acceleration and/or deceleration of the vehicle wheel 2 and/or of said at least one further rotating member 4 and/or of said anti-rotation system 35, instantaneous angular acceleration and/or deceleration of the vehicle 40, yaw angle of the vehicle 40, as well as other data of the vehicle 40, to transmit control signals to said data processing unit of said control and actuation detection system 20 to control the degree of activation of said at least one clutch 8, 108. In this manner, it is possible to obtain a fine adjustment of the angular speed possibly of said at least one further rotating member 4, as well as, if provided, of its rotation direction, in order to obtain the desired gyroscopic moment, e.g. according to the rolling angle of the vehicle 40, preferably a vehicle adapted to roll when turning, in order to make the vehicle 40 more agile when turning.

According to a preferred embodiment, said control and actuation detection system 20 comprises a detecting device comprising at least one phonic wheel of further rotating member 24, associated with at least one further rotating member 4, and at least one phonic wheel 24' associated with such an anti-rotation device 35, and at least one phonic wheel of wheel 22, associated with said vehicle wheel 2, and at least one phonic wheel reading sensor adapted to acquire information on the angular speed and/or direction of rotation of at least one of either, and preferably all, said phonic wheel of further rotating member 24, said phonic wheel 24' of anti-rotation device 35 or said phonic wheel of wheel 22.

According to an embodiment, such a control and actuation detection system 20 comprises at least one data processing unit, e.g. comprising at least one programmable logic controller or PLC, said at least one data processing unit is adapted to process the information detected by said detecting device to transmit control signals automatically to said assembly 1, and preferably to least one clutch 8, 108. In this manner, said control and actuation detection system 20 can adjust the progressive actuation of said at least one clutch 8 so as to permit a gradual consolidation between either said at least one further rotating member 4 and said vehicle wheel 2 and it also allows said control and actuation detection system 20 to implement an adjustment of the progressive actuation of said at least one clutch 108, so as to allow a gradual consolidation between said planet gear set 32 and the vehicle chassis 15 by means of the anti-rotation device 35. According to an embodiment, the anti-rotation device 35 and the planet carrier 34 of the planet gear set 32 may be the same device.

The provision of such a control and actuation detection system 20 is particularly advantageous if said at least one further rotating member 4, e.g. which acts both as a flywheel, acts as an inertial motor to accelerate the vehicle when the service braking action ceases, by way of non-limiting example when in stationary vehicle conditions.

The provision of such a control and actuation detection system 20 is particularly advantageous if said at least one further rotating member 4, e.g. which acts both as a flywheel and as a component of the electrical machine 12, acts at the same time as inertial motor and as electrical motor to accelerate the vehicle when the service braking action ceases, by way of non-limiting example when in stationary vehicle conditions.

The acceleration of the vehicle can be achieved by any combination of the contributions of inertial engine 10, of the pneumatic motor and of the electrical motor 12, which can cooperate with the power supply of vehicle 40 to accelerate the wheel 2 and the vehicle 40.

The provision of such a control and actuation detection system 20 and of said clutch 108 which allow the coupling and the uncoupling between the planet gear set 32 and the vehicle chassis 15 is particularly advantageous if said at least one further rotating member 4, e.g. which acts both as a flywheel, acts as inertial motor to accelerate the vehicle when the service braking action ceases, by way of non-limiting example when in reversing conditions.

According to an embodiment, said control and actuation detection system 20 comprises said detecting device comprising at least an inclinometer, adapted to acquire information on the rolling angle of the vehicle 40, to transmit it to said data processing unit of said control and actuation detection system 20 to adjust the activation of said at least one clutch 8. In this manner, it is possible to obtain a fine adjustment of the angular speed of said at least one further rotating member 4, in order to obtain the desired gyroscopic moment as a function of the rolling angle of the vehicle 40, preferably a vehicle adapted to roll when turning, in order to make the vehicle 40 more agile when turning.

According to an embodiment, said assembly 1 comprises a plurality of further rotating members 4, e.g. a plurality of flywheels 4 adapted to be triggered sequentially by means of control signals, preferably transmitted by said control and actuation detection system 20 on the basis of the information processing detected by said detecting device comprising at least one phonic wheel 22, 24, 24'. Preferably, the flywheels of said plurality of flywheels are connected to one another in series, and at least one clutch and/or a further transmission 6 and/or a centrifugal variable speed drive and/or a CVT transmission or the like capable of transmitting a ratio other than +1 is interposed between two adjacent flywheels of said plurality of flywheels. Preferably, said control and actuation detection system 20 transmits control signals to said at least one clutch between adjacent flywheels of said plurality of flywheels. According to an embodiment, at least one flywheel of said plurality of flywheels can be operatively connected to said vehicle wheel 2. Preferably, said vehicle wheel 2 is associated with a brake disc integral therewith and in respect of which at least one brake caliper is positioned straddling so as to enable a friction braking action to be applied on the vehicle wheel 2 even when said at least one clutch 8 uncouples said at least one flywheel 4 from said vehicle wheel 2. According to an embodiment, said plurality of flywheels is even in number, wherein at least one flywheel of said plurality of flywheels 4 which can be operatively connected to said vehicle wheel 2, rotates in the opposite direction with respect to the others. In this manner, at least one flywheel is provided counter-rotating with respect to the other flywheels of said plurality of flywheels. Preferably, said counter-rotating flywheel forms a pair with another one in order to compensate, and preferably to cancel, the respective gyroscopic forces and not bias the maneuverability of the vehicle 40. By acting on the sizing and/or shape factor, on the mass and on the angular speed of the single flywheels 4, it is possible to calibrate the gyroscopic response even if the flywheels have different angular features and speeds. According to an embodiment, said plurality of flywheels is even in number wherein at least one flywheel of said plurality of flywheels 4 can be operatively connected to said vehicle wheel 2 by means of said clutch, has opposite rotation with respect to the others by virtue of a further transmission 106 which, as a function of the balance of the gyroscopic force, may have a ratio either equal to or different from −1 between the respective flywheels. In this manner, at least one flywheel is provided counter-rotating with respect to the other flywheels of said plurality of flywheels. Preferably, said counter-rotating flywheel forms a pair with another one in order to compensate, and preferably to cancel, the respective gyroscopic forces and not bias the maneuverability of the vehicle 40. Such further flywheels can be connected sequentially to the vehicle wheel 2 and simultaneously between two flywheels constituting a pair of flywheels, and between which a clutch is preferably not provided, while a clutch 8 is preferably provided between the pairs of flywheels which can be then connected to it. For example, by acting on the sizing and/or shape factor, on the mass and on the angular speed of the single flywheels 4, it is possible to calibrate the gyroscopic response even if the flywheels have different angular features and speeds. For example, in this manner, when the angular speed of the vehicle wheel 2 is higher than the angular speed of the flywheel connected to it and belonging to the pair of further flywheels, coupling the clutch, it is possible to slow down the vehicle by rotating the further flywheels 4 and when they reach the maximum angular speed permitted by the ratio at which they will no longer be able to contribute to slowing down or when it will no longer be necessary to slow down the wheel 2, the clutch will be decoupled, then during acceleration or restarting or, e.g. when the angular speed of the wheel is lower than the angular speed of the flywheel 4 which can be coupled to it, the clutch 8 can be advantageously gradually coupled to take advantage of the rotational force of the further flywheels 4, to put the wheel 2 and the vehicle 40 into rotation or to provide further driving torque.

According to an embodiment, said plurality of flywheels shall be odd in number, wherein at least one primary flywheel of said plurality of flywheels comprises at least one braking surface 5 acting as a brake disc, said primary flywheel can be operatively connected to said vehicle wheel 2 by means of a transmission 6 and can be operatively connected by means of a clutch to said further flywheels of said plurality of flywheels, wherein said further flywheels of the plurality of flywheels mutually form pairs and have mutually opposite rotation by means of a transmission system 106 which, according to the balance of the gyroscopic force, may have a ratio equal or different from −1, in order to compensate, and preferably to cancel out, the respective gyroscopic forces and not bias the maneuverability of the vehicle. Therefore, such flywheels, said further flywheels of the plurality of flywheels, have a sequential trigger to the primary and simultaneous flywheel between the flywheel pairs and, preferably a clutch is not provided between the flywheels forming a pair, while preferably a clutch is provided between the successive pairs which can be connected to it. Preferably, among said plurality of flywheels, when provided in an odd number, at least the "primary flywheel" is not balanced and therefore able to bias the maneuverability of the vehicle 40. For example, said at least one non-balanced flywheel generates a gyroscopic effect which is not balanced by a respective flywheel so as to balance, at least partially, a respective vehicle wheel counter-rotating with respect to it and/or a component of the vehicle which generates a gyroscopic effect in the opposite direction, by way of non-limiting example the flywheel of the motor and/or the rotary components of the engine itself. For example, by acting on the sizing and/or shape factor, on the mass, on the angular speed and on the number of flywheels of said plurality of flywheels, it is possible to calibrate the gyroscopic response of the vehicle 40 on which the assembly 1 is installed despite having flywheels with different features, mass and angular speeds. For example, in this manner, when the rotation speed of the further flywheels to the primary flywheel is slower than the rotation speed of the primary flywheel itself, by coupling the clutch 8, it is possible to slow down the vehicle by rotating the further flywheels to the primary flywheel, which is already rotating, and, when they reach the maximum speed at which they can no longer contribute to the slowing down, the clutch 8 will be uncoupled and the braking device 18 can be actuated on the primary flywheel equipped with braking surface 5 in order to further slow and finally also stop the rotation of the wheel 2; successively, during the step of restarting, the clutch 8 can be advantageously and gradually coupled to exploit the rotational force of the further flywheels to the primary flywheel, to put the primary flywheel in rotation and with it the wheel 2 and the vehicle 40 which are stationary until this moment; in the same way, the clutch can be coupled to have further driving torque when the speed of the further flywheels to the primary flywheel is higher than the speed of rotation of the primary flywheel.

According to an embodiment, said plurality of flywheels is odd in number, wherein at least one flywheel of said plurality of flywheels which can be operatively connected to said vehicle wheel 2 has opposite direction of rotation with respect to the others. In this manner, at least one flywheel is provided counter-rotating with respect to the other flywheels of said plurality of flywheels. Preferably, said counter-rotating flywheel forms a pair with another flywheel in order to compensate, and preferably to cancel, the respective gyroscopic forces and does not bias the maneuverability of the vehicle. Preferably, in said plurality of flywheels, when provided in an odd number, at least a flywheel is not balanced and therefore able to bias the maneuverability of the vehicle 40. For example, said at least one non-balanced flywheel generates a gyroscopic effect which is not balanced by a respective flywheel and/or a respectively counter-rotating vehicle wheel. By acting on the sizing and/or shape factor, on the mass, on the angular speed and on the number of flywheels of said plurality of flywheels, it is possible to calibrate the gyroscopic response of the vehicle 40 on which the assembly 1 is installed despite has flywheels with different features and angular speeds.

According to an embodiment, said assembly 1 comprises at least one further transmission to transmit mechanical power between a pair of flywheels and another pair of flywheels 4, by operatively connecting two flywheels belonging to different flywheel pairs.

According to an embodiment, said control signals are manually actuated. According to an embodiment, at least one flywheel of said plurality of flywheels is associated with said kinetic energy recovery device 10.

By virtue of the sequential triggering of multiple flywheels, said flywheels will be in a quiescent state when they are not necessary to be then triggered by command of the rider or by a control and actuation detecting device 20, so as to vary, the revolutions per minute of the vehicle wheel 2 being the same, the amount of energy subtracted from it and stored in form of rotational inertial kinetic energy by said flywheels. In addition, the gyroscopic moment generated by said flywheels and the storage capacity of the rotation inertial kinetic energy can be adjusted. Preferably, the inertial kinetic energy stored by said flywheels is successively transmitted to the vehicle wheel to accelerate it, and/or to bias the attitude of the vehicle 40 and/or to charge at least one accumulator.

According to an embodiment, said plurality of further rotating members 4, e.g. said plurality of flywheels 4, all rotate in the same rotation direction.

According to an embodiment, said rotating members 4 of said plurality of further rotating members 4, e.g. said plurality of flywheels 4, each rotate about a respective flywheel rotation axis X4. Preferably, the respective rotation axes X4 are mutually parallel. According to an embodiment, said plurality of further rotating members 4, e.g. said plurality of flywheels 4 are mutually in axis. In other words, said plurality of further rotating members 4, e.g. said plurality of flywheels 4 rotate about a single rotation axis X4 or extension thereof.

According to a preferred embodiment, said at least one further rotating member 4 is placed coaxial to said vehicle wheel 2 resulting in it inscribed in a substantially concentric way. In this manner, an in-wheel inertial motor can be built.

According to an embodiment, said vehicle wheel rotation axis X2 is parallel to said rotation axis of further rotating member X4 which is placed at a predefined radial distance R4 from said wheel rotation axis X2. In this manner, it is possible to reduce the overall dimensions of said assembly 1 in a direction parallel to said rotation axes X2, X4. For example, it is possible to place at least one further rotating member 4 behind the vehicle wheel 2, e.g. when the vehicle wheel 2 is a wheel of a front axle of a vehicle. For example, it is possible to place at least one further rotating member 4 above the vehicle wheel 2. According to an embodiment, said vehicle wheel rotation axis (X2) is parallel to said flywheel rotation axis (X4) and placed at a predetermined distance (R4) from said flywheel axis, wherein said flywheel (4) has a diameter smaller than the difference between the diameter of the vehicle wheel (2) and said predefined distance, being contained within the radial dimensions of the vehicle wheel (2).

According to an embodiment, said kinetic energy recovery device 10 is formed by said at least one further rotating member 4. In this manner, said at least one further rotating member 4 forms at least in part an inertial motor. In this manner, it is possible to store kinetic energy transmitted from the vehicle wheel 2 to at least one further rotating member 4 in form of inertial energy of a body, preferably said at least one rotating flywheel. According to an embodiment, said kinetic energy recovery device 10 comprises windings and magnets to form an electrical machine 12, e.g. an electrical generator. In this manner, it is possible to store kinetic energy transmitted from the vehicle wheel 2 to at least one further rotating member 4 in form of electrical energy. According to an embodiment, said kinetic energy recovery device 10 comprises an electrical machine 12, e.g. a dynamo, adapted to transform the kinetic energy into electrical energy, preferably into direct current. According to an embodiment, said kinetic energy recovery device 10 further comprises at least one accumulator, adapted to store the electrical energy generated by the electrical machine 12, charging itself. Preferably, said electrical energy storage accumulator or battery is operatively connected to said at least one further rotating member 4. For example, said accumulator formed by said at least one further rotating member 4 can store part of the produced electrical energy, preferably all of it.

According to a variant embodiment, said electrical energy storage accumulator or battery is aboard the vehicle and electrically connected to the other parts of the electrical machine 12. For example, said accumulator aboard the vehicle 40 can store some of the produced electrical energy, preferably all of it. According to an embodiment, said electrical accumulator formed by said further rotating member 4, e.g. a flywheel, and said electrical accumulator aboard the vehicle 40 are operatively interconnected with each other in useful manner in order to cooperate.

According to an embodiment, said accumulator is formed by at least one further rotating member 4. In this manner, said flywheel forms an inertial accumulator or flywheel battery which stores kinetic energy in form of rotational kinetic energy of the flywheel, and/or in form of electrical energy stored in the flywheel battery itself. According to an embodiment, a pneumatic machine transforms the kinetic energy stored by the further rotating member into potential energy in the form of compressed air. For example, such an accumulator comprises at least one air spring and/or a diaphragm spring which bias a piston. For example, such an accumulator comprises at least one cylinder containing pressurized fluid, e.g. nitrogen, which cooperates with a membrane and/or a shock absorber.

According to an embodiment, said accumulator is formed by said flywheel. In this manner, said flywheel forms an inertial accumulator or flywheel battery which stores kinetic energy in form of rotational kinetic energy of said at least one further rotating member 4 and/or in form of potential energy (pressurized fluid) stored in the flywheel battery itself. According to an embodiment, said pneumatic or hydraulic machine, e.g. a pneumatic motor, is adapted to transform the pressurized fluid stored by said at least one accumulator into mechanical energy. According to an embodiment, said pneumatic or hydraulic machine, e.g. a pneumatic motor, adapted to transform the pressurized fluid stored by said at least one accumulator into kinetic energy, e.g. flywheel rotation energy, and said pneumatic or hydraulic machine, e.g. a dynamo, adapted to transform the kinetic energy into potential energy (pressurized fluid), preferably in compressed air, are the same pneumatic or hydraulic machine. The dimensions of the kinetic energy recovery device 10 are reduced in this manner.

According to an embodiment, said inertial engine 10 and said pneumatic motor cooperate simultaneously to accelerate said vehicle wheel 2 and said vehicle 40.

According to an embodiment, said inertial engine 10 and said electrical machine simultaneously cooperate with each other and with the power supply device of vehicle 40 to increase power and acceleration transmitted to said vehicle wheel 2 and said vehicle 40.

According to an embodiment, said kinetic energy recovery device 10 comprises a device for controlling the power input to said at least one accumulator. Preferably, said accumulator is adapted to deliver, in a given time interval, an electrical power pattern suited to counteract an electromotive reaction generated by said at least one accumulator during charging, in other words, while said accumulator is charging. By virtue of said power control device, it is possible to optimize the charging time of at least one battery. By virtue of said power control device, it is possible to manage the recharge torque, and therefore the torque which brakes said at least one further rotating member 4, within the range useful to recharge and to minimize losses. Therefore, e.g. in the event of service braking causing the vehicle to come to a sudden halt 40 which does not allow time for all kinetic energy to be converted into charging torque during the braking action, the power control device allows, under stationary vehicle conditions and with at least one further rotating member 4 in rotation, to deliver the required amount or dosage of charging torque according to the charging capacity of the accumulator itself. By virtue of said power control device, it is possible to manage the recharge torque, and therefore the torque which brakes said at least one more rotating member 4 also while the vehicle is stationary. If it is necessary to accelerate with the vehicle 40 and said at least one more rotating member 4 has not yet stopped the rotation, the power control device can modulate the braking torque until it stops so as to be able to advantageously use, by means of the coupling of the clutch 8, the remaining flywheel torque directly to start the rotation of the vehicle wheel 2.

According to an embodiment, said kinetic energy recovery device 10 comprises a device for controlling the power output from said at least one accumulator. By virtue of said output power control device, it is possible to manage the drive torque generated by the electrical machine 12 to the vehicle wheel 2.

Preferably, the electrical energy stored by said accumulator, preferably by said flywheel electrical accumulator 4, is then transmitted to the electrical machine 12 to accelerate the vehicle wheel 2. For example, to accelerate the vehicle 40.

According to an embodiment, said inertial machine 10 and said electrical machine 12 simultaneously cooperate in accelerating the vehicle wheel 2. For example, to accelerate the vehicle 40.

According to an embodiment, said inertial engine 10 and said electrical machine 12 simultaneously cooperate with each other and with the power supply device of the vehicle 40 to increase the power and acceleration transmitted to said vehicle wheel 2 and to said vehicle 40.

According to an embodiment, said assembly 1 is adapted for retrofitting operations on vehicles pre-existing the invention. Such retrofitting operations may involve the simple removal of a wheel component pre-existing at the invention from the vehicle 40, or may also involve the use of further dedicated interface components. Such retrofitting operations may provide the reuse of components pre-existing the modification, by way of non-limiting example in FIG. 5A, the pre-existing brake disc is installed on the further rotating member 4 by means of the fastening elements 44, so that can perform the dual function of braking the wheel 2, possibly until it stops, and of counter-rotating flywheel to make the vehicle 40 agile.

According to an embodiment, a transmission 6; 106 for a vehicle 40 is provided. The transmission 6; 106 may comprise any one of the features described with reference to one or more embodiments of said transmission 6; 106.

Preferably, the transmission 6, 106 comprises a gear train, e.g. a planetary gear set, comprising planet gears 33 associated with a planet carrier 34.

Preferably, the transmission 6; 106 achieves a ratio other than +1.

By virtue of the provision of such a transmission, the planet carrier 34 can be formed by at least one of either: said at least one vehicle wheel 2, said vehicle chassis 15, a suspension system, e.g. a fork or swingarm, operatively connected to the at least one vehicle chassis 15, at least one fork leg 25, said at least one brake caliper support 27, said braking device 18, preferably friction braking device 35.

Preferably, the transmission 6; 106 comprises an ratchet wheel 23, or ratchet wheel 23, adapted to transmit the rotational motion in one direction only.

According to a general embodiment, a vehicle wheel assembly is provided comprising at least one assembly 1 according to any one of the embodiments described above, where applicable.

Preferably, when said at least one further rotating member 4 acts as a flywheel, said wheel assembly forms an in-wheel motor. In this manner, an inertial motor can be fully housed in the radial dimension of vehicle wheel 2, and preferably in the volumetric dimension of vehicle wheel 2.

According to an embodiment, the in-wheel inertial motor is associated with an in-wheel electrical motor comprising a rotor and a stator to deliver drive power to the vehicle wheel 2, e.g. the electrical motor is the electrical machine 12.

The provision of such a vehicle wheel assembly comprising such a flywheel 4 counter-rotating with respect to the wheel 2 allows to keep the overall dimensions compact so as to create an in-wheel inertial motor, i.e. contained within the overall dimensions of vehicle wheel 2. For example, if the vehicle is already equipped with an in-wheel motor, with the weight of the engine integrated in the vehicle wheel 2 increasing its gyroscopic momentum and making the vehicle 40 not very agile, the provision of such an assembly 1 allows to compensate the gyroscopic effect generated by the vehicle wheel 2, making the vehicle 40 more agile.

Preferably, when said at least one further rotating member 4 comprises said braking surface 5, said wheel assembly forms an in-wheel brake.

According to an embodiment, said at least one further rotating member 4 acts as a flywheel and comprises at least a braking surface 5, so as to form an inertial motor and/or an in-wheel braking system and/or a destabilizing system to make the vehicle more agile or a combination of these features.

According to a preferred embodiment, said vehicle wheel unit is adapted for retrofitting operations on vehicles pre-existing the invention. Such retrofitting operations may involve the simple removal of a wheel component pre-existing at the invention from the vehicle 40, or may also involve the use of further dedicated interface components.

According to a preferred embodiment, said at least one further rotating member 4 is one of either the stator or rotor of the electrical machine 12 and the rim body 42 is the other of either the stator or rotor of the machine 12, wherein at least one further rotating member 4 and the rim body 42 are operatively connected by a transmission 6 which transmits a negative ratio, i.e. at least one further rotating member 4 and the rim body 42 counter-rotate so that the respective gyroscopic forces resulting from the rotation of the stator and rotor of the electrical machine 12 balance one another, at least in part, preferably cancel each other, making the vehicle 40 agile.

According to a general embodiment, the vehicle 40 is provided comprising at least one assembly 1 according to any one of the embodiments described above.

Figure 2:
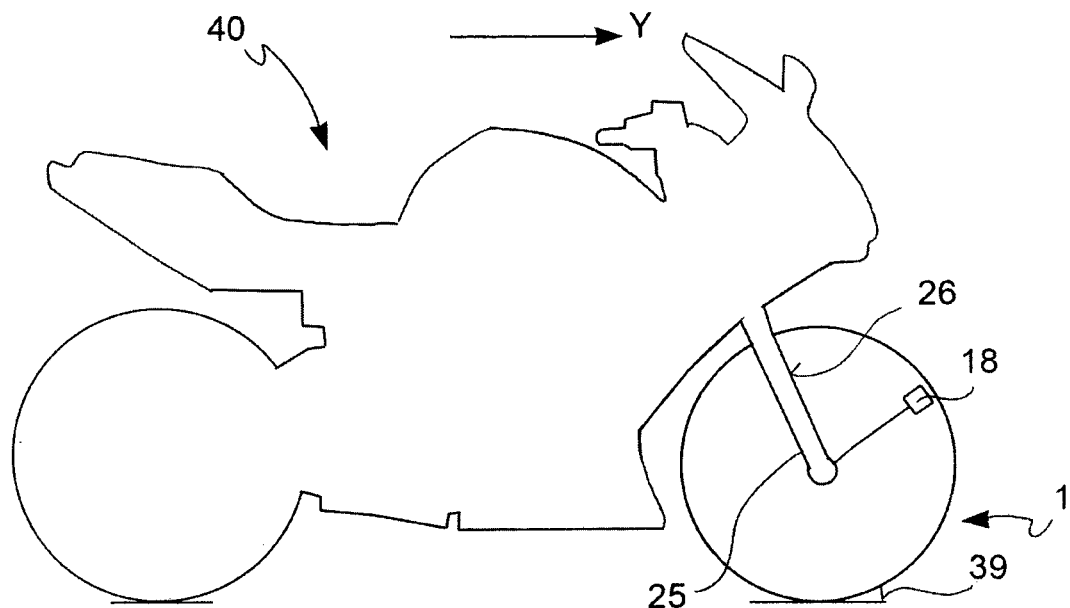
FIG. 2 A diagrammatically shows a vehicle comprising an assembly, according to an embodiment.
Figure 2:
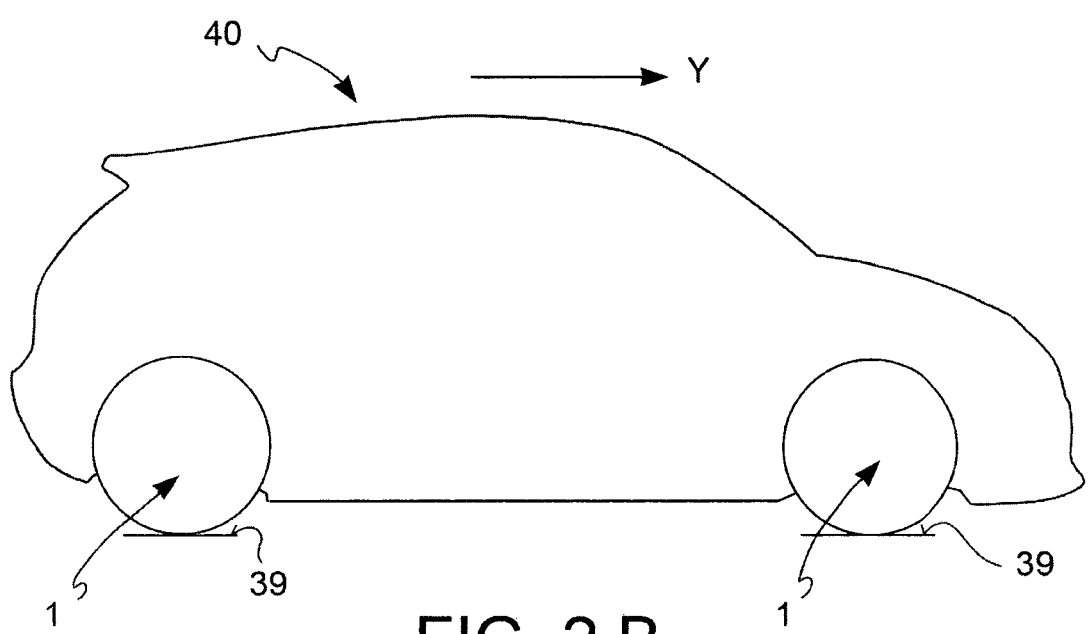

According to an embodiment, e.g. as shown in FIG. 2-A, a vehicle 40 is a vehicle to be mounted which comprises at least an assembly 1 comprising at least one vehicle wheel 2 and at least one further rotating member 4 which acts at least as a brake disc operatively connectable to vehicle wheel 2 by means of a transmission 6 which produces a negative transmission ratio, wherein the brake caliper is arranged facing the front side 26 of the fork 25 of the vehicle 40 and is provided to brake vehicle wheel 2, possibly until it stops. In this manner, when the vehicle 40 proceeds in the forward travel direction Y, the disc output side of the brake caliper faces the fork 25 by the effect of the counter-rotation between vehicle wheel 2 and a further rotating member 4 with respect to the vehicle chassis 15, e.g. the fork 25.

According to an embodiment, said vehicle is a vehicle powered by an internal combustion engine or a hybrid engine, in other words, an endothermic engine or an endothermic engine assisted by a further traction system having another type of power supply. In this manner, the provision of said assembly 1 as described in any of the embodiments presented here, comprising said at least one flywheel, allows to reduce the fuel consumption of said internal combustion engine of said vehicle.

According to an embodiment, said vehicle is a vehicle powered by an electrical or hybrid motor.

According to an embodiment, said vehicle is a vehicle powered by muscle traction, gravity or other force, such as a velocipede, e.g. a pedal-assisted or hybrid bicycle. The motor vehicle can be powered by alternative energies, e.g.: gravitational force, and/or kinetic force, and/or pneumatic force.

According to a preferred embodiment, said vehicle is a vehicle to be mounted, e.g. a motorcycle. Preferably, said motorcycle is a high-performance motorcycle, e.g. a racing motorcycle.

According to a preferred embodiment, said motorcycle comprises a forecarriage comprising at least one front wheel, wherein said forecarriage comprises said vehicle wheel 1 so that said vehicle wheel 2 is a front wheel of the motorcycle. For example, the forecarriage of said motor vehicle comprises two front wheels side-by-side, preferably having a coincident rotation axis, and said vehicle wheel 2 is any one of, but also both, said two front wheels side-by-side.

According to an embodiment, said assembly 1 comprises at least two vehicle wheels 2, preferably side-by-side, operatively connected to a single at least one further rotating member 4.

According to a preferred embodiment, said motorcycle comprises a rear axle comprising at least one rear wheel, wherein said rear axle comprises said vehicle wheel 1 so that said vehicle wheel 2 is a rear wheel of the motorcycle.

According to a general embodiment, a control and actuation detection system 20 according to any one of the embodiments described above, adapted to control an assembly 1 according to any of the previously described embodiments, is provided.

At least one further rotating member 4, preferably at least one flywheel, may be fitted with added masses 29 to adjust the angular momentum and thus the inertia to the rotation of said at least one further rotating member 4.

Said assembly 1 may also be applied on at least one, each or all wheels of a quadricycle, of a car such as a racing car, preferably a rally car and the like, or of a commercial vehicle, a truck and the like.

Said assembly 1 may also be applied on at least one, each or all wheels of a vehicle to be mounted, e.g. for racing applications.

A braking method will be described below.

A braking method of a vehicle 40 comprising the step of operatively connecting at least one vehicle wheel 2 to at least one further rotating member 4.

The method comprises the step of determining that the vehicle wheel 2 and at least one further rotating member 4 both rotate with respect to a portion of the chassis 15 of the vehicle 40 with unequal angular speed.

The method comprises applying a braking action on the further rotating member 4 by braking the vehicle wheel 2.

According to a possible mode of operation, the method comprises the further step of stopping the vehicle wheel 2 by applying a braking action on the further rotating member 4.

According to a possible mode of operation, the vehicle comprises the further step of providing an assembly 1 according to any one of the embodiments described above.

A kinetic energy recovery method is described below.

A kinetic energy recovery method of a vehicle wheel 2 comprising the steps of operatively connecting at least one flywheel 4 to vehicle wheel 2 and transmitting a share of the kinetic energy of vehicle wheel 2 to at least one flywheel 4.

According to a possible mode of operation, the method comprises the further step of operatively connecting at least one flywheel pair to the vehicle wheel 2.

According to a possible mode of operation, the method comprises the further step of determining that the vehicle wheel 2 and the at least one flywheel 4 both rotate with respect to a portion of the chassis 15 of the vehicle 40 at non-equal angular speed.

According to a possible mode of operation, the step of operatively connecting comprises the step of transmitting control signals to at least one clutch.

According to a possible mode of operation, the vehicle comprises the further step of providing an assembly 1 according to any one of the embodiments described above.

A method for increasing the instantaneous power of a vehicle is described below.

A method for increasing the instantaneous power of a vehicle comprises the following steps:
storing a first share of the kinetic energy of a vehicle wheel 2, e.g. in the form of inertial and/or pneumatic and/or hydraulic and/or electrical potential energy;
returning a second share of the potential energy stored to vehicle wheel 2 to accelerate it.

According to a possible mode of operation, the vehicle comprises the step of providing an assembly 1 according to any one of embodiments described above to perform the step of storing and/or the step of returning.

The step of storing may be performed by said at least one flywheel 4, e.g. during braking of vehicle wheel 2.

The step of returning may be performed by said at least one flywheel 4.

According to a possible mode of operation, the first share is either greater than or equal to the second share, and preferably greater.

According to a general embodiment, an assembly 1 is provided comprising at least one vehicle wheel 2, adapted to rotate around a vehicle wheel axis X2 and adapted to perform an at least rolling movement on a travel surface for the vehicle; and
at least one flywheel 4, operatively connectable to said at least one vehicle wheel 2 and adapted to rotate about a flywheel axis X4; and
at least one transmission device 6 or transmission 6 adapted to transmit kinetic energy from the vehicle wheel 2 to the flywheel 4;
wherein, when in operating conditions, said transmission device 6 transmits a counter-rotation movement of the vehicle wheel 2 to the flywheel 4, thus rotating the vehicle wheel 2 and the flywheel 4 in mutually opposite directions, so as to generate two opposed gyroscopic forces to make agile a vehicle associable with said assembly 1.

The assembly 1 may further comprise any of the features described in any of the embodiments described above with reference to an assembly 1.

According to an embodiment, said transmission device 6 is adapted to transmit kinetic energy also from the flywheel 4 to the vehicle wheel 2, so that, when in operating conditions, said transmission device 6 also transmits a counter-rotation movement from the flywheel 4 to the vehicle wheel 2.

According to an embodiment, said assembly 1 comprises at least one flywheel braking device associated with said flywheel 4, said at least one flywheel braking device is adapted to apply a braking action on said flywheel 4 to brake the vehicle wheel 2 by means of said transmission device 6.

According to an embodiment, said at least one transmission device 6; 106 comprises a ratchet wheel mechanism 23, or ratchet wheel, and/or an overrunning wheel 23 or the like, adapted to transmit the rotational motion in a single rotation direction.

According to an embodiment, said assembly 1 comprises at least one clutch 8 adapted to connect and disconnect selectively and operatively said vehicle wheel 2 and said flywheel 4, in order to uncouple said flywheel 4 from said vehicle wheel 2.

According to an embodiment, said assembly 1 further comprises at least one manual control and actuation system of said at least one clutch 8.

According to an embodiment, said assembly 1 further comprises a control and actuation detection system 20, adapted to detect vehicle state information and process said vehicle state information to transmit control signals to said at least one clutch 8 in an automatic manner.

According to an embodiment, said vehicle wheel assembly comprises at least an assembly 1 as described above, forming an in-wheel inertial motor.

According to an embodiment, said vehicle wheel unit 30 is adapted for retrofitting operations on vehicles pre-existing the invention.

According to a general embodiment, the vehicle comprises at least one assembly 1 according to any one of the embodiments described above.

According to an embodiment, said vehicle is adapted to tilt or roll when turning.

According to an embodiment, said transmission device 6 has at least one portion of solidification with the vehicle so as to act as a planetary gear set.

According to an embodiment, said transmission device 6 has at least one portion which can be consolidated with the vehicle so as to act as a differential.

According to an embodiment, a control and actuation detection system 20 is provided, adapted to control an assembly 1 according to any one of the embodiments described above, comprising at least one detecting device, adapted to detect vehicle state information, at least one data processing unit, adapted to process the information detected by said detecting device to transmit control signals automatically to said assembly 1.

According to an embodiment, said at least one data processing unit is adapted to process the information detected by said detecting device to transmit control signals automatically to said at least one clutch 8 of said assembly 1, in order to implement a progressive actuation of said at least one clutch 8 so as to allow a gradual consolidation between said at least one flywheel 4 and said vehicle wheel 2.

According to an embodiment, said detecting device comprises at least one of either:
at least one inertial platform, adapted to detect dynamic parameters of the vehicle which can be associated with said assembly 1, preferably comprising one or more gyroscopes and/or one or more accelerometers;
at least an inclinometer, adapted to acquire information on the rolling angle of the vehicle, to transmit it to said data processing unit of said control and actuation detection system 20 to adjust the activation of said at least one clutch 8;
at least one flywheel phonic wheel 24, associated with said flywheel 4, and at least one wheel phonic wheel 22, associated with said vehicle wheel 2, and at least one phonic wheel reading sensor adapted to measure the angular speed of at least one, and preferably both, said flywheel phonic wheel 24 and said wheel phonic wheel 22, so as to acquire information on the relative angular speed between said flywheel 4 and said vehicle wheel 2.

By virtue of the features described above, provided either separately or in combination, where applicable, it is possible to respond to the needs mentioned above, and to obtain the aforesaid advantages, in particular:

it allows to exploit the gyroscopic effect favorably to make a vehicle more agile;

it allows to reduce an excessive stabilization of the vehicle;

at the same time, it allows to exploit the gyroscopic effect favorably to make a vehicle more stable, e.g. a vehicle suited for rolling, under given conditions, such as when starting;

it allows to achieve a further stabilization of the vehicle;

it allows to reduce the fuel consumption of a vehicle;

it allows to reduce the environmental impact;

it allows to brake the vehicle, possibly until it stops, by braking at least one further rotating member associated with the wheel by means of a transmission ratio other than +1;

therefore, it allows to select the transmission ratio, which does not necessarily need to be adjustable, to achieve the desired effect on braking performance;

it allows to make the vehicle more agile with a single rotating member associated with the vehicle wheel and at the same time to increase the braking torque delivered with the same clamping force of the brake caliper;

therefore, it allows to reduce the overall dimensions of the braking system axially, i.e. parallel to the rotation axis of the wheel, with the same braking torque delivered;

for example, in the case of a motor vehicle, it allows to make the motor vehicle more agile in rolling conditions, reducing the gyroscopic inertia of the assembly and therefore of the vehicle and at the same time it allows to deliver an increased braking torque with the same clamping force of the caliper, allowing the rider of the motor vehicle a smoother and less tiring and safer ride;

furthermore, it allows to reduce the wheelbase of the motorcycle fork, the delivered braking torque being equal;

for example, in the case of a car, it allows to make the car more agile when in turning conditions of the line, reducing the gyroscopic inertia of the assembly and reducing the side drag of the wheels, therefore of the vehicle, and at the same time it allows to deliver an increased braking torque with the same clamping force of the caliper, allowing the driver of the car a smoother and less tiring and safer drive;

at the same time, it allows to achieve a given desired operating temperature of the brake disc within a predefined vehicle speed range, so that the use of carbonceramic brake discs can be made efficient even at low vehicle speeds;

it allows to set the braking torque in relation to the braking force by playing on the transmission ratio between the vehicle wheel and at least one other braking device;

it allows to select the transmission ratio so as to allow a given desired brake caliper configuration, e.g. it allows to approach the brake caliper in inner radial direction RI to the wheel hub without requiring an increase in the caliper clamping force, delivered braking torque being the same;

at the same time, it allows to select the transmission ratio to allow a given desired brake disc diameter;

it allows to use a flywheel as an inertial motor as well as a potential energy accumulator (pressurized fluid);

it allows to use a flywheel as electrical energy storage;

it allows to set the relative movement between friction material and at least one further rotating member device (e.g. between brake pad and brake disc) in a targeted manner so that it is better suited to apply the braking action within the speed range of the vehicle for which the vehicle is designed or for which the vehicle is used, e.g. when the vehicle is a racing vehicle, as well as depending on weather conditions, such as wet conditions;

it allows to set the relative speed between the friction material and at least one further rotating member element (e.g. between brake pad and brake disc) so that it is more suited for the speed range of the vehicle;

in all cases, it allows for the components of the said transmission device, such as the teeth of the gears, to remain within a fatigue safety range;

at the same time, it allows to reduce the consumption of friction material, the delivered braking torque being the same, with a consequent positive effect in terms of environment-friendliness;

it allows for some components, preferably all the components, e.g. the transmission, the clutch, the further rotating members and the rolling parts, to remain enclosed and lubricated, e.g. in the wheel space, with a consequent reduction in friction and a positive effect in terms of consumption and environment-friendliness;

it is possible to obtain a versatile vehicle braking mechanism which guarantees a high degree of customization of the braking parameters;

it promotes the use of materials suited for recycling, e.g. in foundries, such as steel and metals, with a positive effect in terms of environment-friendliness, while allowing a high degree of customization of braking parameters, at least partially comparable to that which would be achieved with the use of electronic control systems;

it allows to use a flywheel as an inertial motor, as well as an inertial accumulator, which allows the electrical accumulator to be recharged even when the vehicle is stationary, thus increasing the amount of recovered energy and reducing consumption;

it allows to use said flywheel as an inertial motor as well as an inertial accumulator, which allows the recharging of the electrical accumulator even when the vehicle is stationary and to use it, usefully, for starting the vehicle in case the flywheel was still rotating at the time of restart;

it allows to manufacture an in-wheel inertial motor;

it allows to manufacture an in-wheel inertial accumulator;

it allows to manufacture an electrical in-wheel accumulator;

it allows to obtain a wheel unit suited to act as an in-wheel accumulator, in-wheel motor, in-wheel brake for the in-wheel vehicle;

it allows to create an in-wheel electrical motor, wherein the one of either the rotor or the stator rotate, generating inverse gyroscopic moments which make the vehicle more agile;

it allows to manufacture an in-wheel electrical motor, wherein one of either the rotor or the stator counter-rotate generating inverse gyroscopic moments wherein either one can be adjusted in the number of revolutions in order to achieve the desired gyroscopic balance and vary the agility of the vehicle at the necessary and/or desired conditions;

it allows to create an in-wheel hybrid, inertial and electrical motor, in which the one of either the rotor or the stator counter-rotate generating inverse gyroscopic moments which make the vehicle more agile;

it allows to manufacture an in-wheel hybrid, inertial and electrical motor, wherein one of either the rotor or the stator counter-rotate generating inverse gyroscopic moments, in which either one can be adjusted in the number of revolutions in order to achieve the desired gyroscopic balance and vary the agility of the vehicle at the necessary and/or desired conditions;

it allows to manufacture an in-wheel hybrid motor in which at least two of either said inertial motor, said pneumatic motor or said electrical motor cooperate simultaneously to accelerate the wheel and the vehicle.

it allows to manufacture a hybrid motor in which at least either said inertial motor, said pneumatic motor or said electrical motor cooperates with the vehicle power supply to accelerate the wheel and the vehicle. For example, by significantly increasing the power and acceleration of the vehicle.

it allows to adjust the negative transmission ratio to obtain a counter-rotation motion such that it has a neutral gyroscopic bias (with a transmission ratio of −1) on the vehicle, or capable of destabilizing or hyper-stabilizing the vehicle;

it allows to place the brake caliper in front of the fork;

at the same time, it allows to improve the cooling of said brake caliper by placing it in front of the fork, in order to expose it to a cooling air current;

it allows to reduce the unsprung masses of the vehicle without reducing the robustness and reliability of the assembly;

it allows to modify pre-existing vehicles;

on existing vehicles originally fitted on a single wheel with two braking systems, it allows to modify them by adjusting the braking torque so that only one braking system can be installed, e.g. to reduce unsprung masses and the amount of maintenance required.

Of course, combinations of features provided for in the accompanying claims are to be considered an integral part of this description.

The person skilled in the art may make many changes and adaptations to the embodiments described above or may replace elements with others which are functionally equivalent in order to meet contingent needs without departing from the scope of the appended claims.

LIST OF REFERENCE

1. Assembly
2. Vehicle wheel
3. Wheel axle
4. Further rotating member
5. Braking surface
6. Transmission
8. Clutch
10. Kinetic energy recovery device
12. Electrical machine
12'. First portion of electrical machine
12". Second portion of electrical machine
15. Vehicle chassis
18. Braking device or friction braking device
20. Control and actuation detection system
22. Vehicle phonic wheel
23. Ratchet wheel or ratchet wheel
24. Further rotating member phonic wheel
24'. Phonic wheel of the planetary gear set anti-rotation device
25. Motorcycle fork
26. Front side
27. Braking device support
29. Added masses or radial masses
31. Ring gear
31'. Ring gear carrier
32. Planet gear set
33. Planet gear
34. Planet carrier
35. Planetary gear set anti-rotation device
36. Planet carrier reinforcement ring
37. Pinion
38. Clutch spring
39. Advancement surface
40. Vehicle
41. Tire
42. Rim body
43. Rolling members
44. Fastening elements
45. Clutch actuation device
46. Wiring
47. Sliding contacts
48. Clutch friction material
49. Clutch interface
51. Clutch first portion
52. Clutch second portion
106. Further transmission
108. Clutch
X-X. Axial direction
X2. Vehicle wheel rotation axis
X4. Further rotating member rotation axis
Y. Forward direction of the vehicle
R-R. Radial direction
RI. Inner radial direction
RO. Outer radial direction
R4. Predetermined radial distance
C-C. Tangential or circumferential direction
C2. Wheel rotation
C4. Rotation of further rotating member

The invention claimed is:

1. An assembly comprising:
at least one vehicle wheel configured to rotate about a vehicle wheel axis and configured to perform an at least rolling movement on a travel surface for a vehicle;
at least two flywheels to create a flywheel pair, the flywheel pair being located within a radial dimension of the vehicle wheel or placed at a predefined radial distance of a wheel rotation axis, the flywheel pair being configured to rotate about a flywheel axis, that is operatively connected to said at least one vehicle wheel in such a way the vehicle wheel transmits kinetic energy to the flywheels;
at least one kinetic energy recovery device operatively associated with said flywheels and configured to store kinetic energy transmitted to said flywheels to make the kinetic energy available for subsequent uses;
at least one clutch configured to connect and disconnect selectively and operatively said vehicle wheel and said flywheels, in order to uncouple said flywheels from said vehicle wheel, to allow said flywheel to rotate due to inertia when the vehicle wheel is stopped, and in such way to couple said vehicle wheel when at a standstill to said flywheels rotating due to inertia, to transfer a start-up rotational motion from said flywheels to said vehicle wheel.

2. The assembly according to claim 1, wherein the flywheels of said flywheel pair are mutually counter-rotating, and the assembly further comprising a transmission that operatively connects to each other the flywheels of said flywheel pair.

3. The assembly according to claim 1 further comprising more than one flywheel pairs, and at least another further transmission to transmit mechanical power between the flywheel pair and another further flywheel pair operatively connecting to each other, with two flywheels belonging to different flywheel pairs.

4. The assembly according to claim 1 further comprising at least one transmission configured to transmit mechanical power between said vehicle wheel and said flywheel pair, wherein said transmission achieves a transmission ratio that is equal or greater than 1.

5. The assembly according to claim 1 further comprising at least one clutch configured to selectively and operatively connect and disconnect to each other the flywheels of said flywheel pair.

6. The assembly according to claim 1, wherein a transmission is integral with a portion of a vehicle chassis, wherein the portion is a fork leg.

7. The assembly according to claim 1, wherein said transmission comprises a ring gear, a planet gear set, satellite gears of said planet gear set are associated with a planet carrier and a pinion.

8. The assembly according to claim 1, wherein said transmission comprising:
a gear train including a pair of gears, a first of two gears of the pair of gears being connected to either the vehicle wheel or at least one of the flywheels, and a second of the two gears of the pair of gears being connected to a second flywheel of the flywheel pair or the vehicle wheel; or
at least one gear train, adapted to transmit a rotational movement, wherein said at least one gear train comprises at least a pair of toothed pulleys and a toothed belt, mutually in contact, wherein rotation pins of said toothed pulleys have at least one portion of solidification with a chassis of the vehicle.

9. The assembly according to claim 1, wherein said transmission comprises a continuously variable transmission.

10. The assembly according to claim 1, further comprising kinetic energy recovery device comprising an electrical machine including a rotor and a stator, wherein at least one of said flywheels forms either the rotor or the stator of said electrical machine, and wherein said vehicle wheel forms the other either the rotor or the stator of said electrical machine opposite to that of said at least one of said flywheels.

11. The assembly according to claim 10, wherein said kinetic energy recovery device including one or combination selected from the group consisting of:
at least one electrical accumulator operatively connected to said at least one of said flywheels and configured to store electric energy generated by the electric machine, thereby charging itself,
at least one electrical accumulator formed by said at least one of said flywheels so that said flywheels form an inertial accumulator or flywheel battery that stores kinetic energy in form of rotational kinetic energy of the flywheels;
an electrical energy storage battery is provided aboard the vehicle and is connected to the electric machine); and
an electrical accumulator formed by said flywheels and a second electrical accumulator aboard the vehicle that are operatively and mutually interconnected in order to cooperate.

12. The assembly according to claim 10, wherein said electrical machine is an electrical motor configured to transform electrical energy into motive force.

13. The assembly according to claim 10, wherein said kinetic energy recovery device comprises a control device of a power input into at least one accumulator, said control device being adapted to output an electrical power pattern in a given time interval adapted to counteract an electromotive reaction generated by said at least one accumulator while charging; and wherein said control device of a power output by said electrical accumulator controls a drive torque applied to the vehicle wheel by the electrical machine itself.

14. The assembly according to claim 1, wherein said kinetic energy recovery device comprising:
at least two motors selected from the group consisting of an inertial motor, a pneumatic motor and an electrical motor to form an in-wheel hybrid motor in which the at least two motors cooperate simultaneously and mutually to accelerate the vehicle wheel and the vehicle; or
at least either one of an inertial motor, a pneumatic motor or an electrical motor to form a hybrid motor with a power supply of the vehicle to cooperate in accelerating the vehicle wheel and the vehicle by increasing the power and acceleration of the vehicle.

15. The assembly according to claim 1, wherein said clutch is operable by means of a control device manually operated or automatically operated in response to a detection of information on a state of the vehicle that is associated to said assembly.

16. The assembly according to claim 1, further comprising a control and actuation detection system adapted to detect state information of the vehicle and process said information on the state of the vehicle that is associated to said assembly, and wherein said control and actuation detection system comprises at least one inertial platform, at least one data processing unit configured for processing said state information of the vehicle to automatically transmit control signals to said at least one clutch.

17. The assembly according to claim 1, wherein said flywheel pair comprising a plurality of flywheels adapted to be triggered sequentially by means of control signals transmitted by a control and actuation detection system of said assembly on a basis of processing information detected by at least one phonic wheel, and wherein at least one flywheel of said plurality of flywheels is associated to a kinetic energy recovery system.

18. The assembly according to claim 1, wherein a combination of mass and shape and angular velocity of a pair of further flywheels having different mass and/or different shape and/or different angular velocity determines that the flywheels of the pair of further flywheels have mutually equal or similar gyroscopic moment, in such a way that said further flywheels coupled one another by said transmission having opposite direction of rotation compensate or nullify gyroscopic moment of said further flywheels or make it negligible in respect of an effect on the vehicle.

19. The assembly according to claim 1, comprising a flywheel braking device associated to said flywheels, said flywheel braking device being configured to exert a braking action onto said flywheels to brake the vehicle wheel through said transmission.

20. A method of recovery of kinetic energy of a vehicle wheel, said method comprising the steps of:
a) operatively connecting at least one pair of flywheels to the vehicle wheel, so that the flywheels are located within a radial dimension of the vehicle wheel or placed at a predefined radial distance of a wheel rotation axis;
b) transmitting a share of kinetic energy of the vehicle wheel to the flywheels by way of at least one clutch, wherein the clutch being configured to connect and disconnect selectively and operatively the vehicle wheel and the flywheels, in order to uncouple the flywheels from the vehicle wheel;
c) determining that the vehicle wheel and at least one of the flywheels rotates in respect of a portion of a chassis of a vehicle with non-equal angular velocity; and
d) increasing an instantaneous power of the vehicle comprises the following steps:
   storing a first share of the kinetic energy of the vehicle wheel in the form of inertial and/or pneumatic and/or hydraulic and/or electrical potential energy; and
   returning a second share of potential energy stored to the vehicle wheel to accelerate the vehicle wheel;
at least one kinetic energy recovery device operatively associated with said flywheels and configured to store kinetic energy transmitted to said flywheels to make the kinetic energy available for subsequent uses;
at least one clutch configured to connect and disconnect selectively and operatively said vehicle wheel and said flywheels, in order to uncouple said flywheels from said vehicle wheel, to allow said flywheel to rotate due to inertia when the vehicle wheel is stopped, and in such way to couple said vehicle wheel when at a standstill to said flywheels rotating due to inertia, to transfer a start-up rotational motion from said flywheels to said vehicle wheel.

* * * * *